United States Patent [19]
Abe et al.

[11] Patent Number: 5,993,719
[45] Date of Patent: *Nov. 30, 1999

[54] METHOD OF PRODUCING A LAMINATED MOLDING

[75] Inventors: Tomokazu Abe; Yoshiaki Saito, both of Ichihara; Terunobu Fukushima, Maebashi, all of Japan

[73] Assignee: Idemitsu Petrochemical Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/524,466

[22] Filed: Sep. 7, 1995

[30] Foreign Application Priority Data

| Sep. 8, 1994 | [JP] | Japan | 6-214773 |
| Sep. 8, 1994 | [JP] | Japan | 6-214774 |
| Sep. 8, 1994 | [JP] | Japan | 6-214775 |

[51] Int. Cl.$^6$ .............. B27N 3/08; B29C 45/16; B32B 31/06
[52] U.S. Cl. ........... 264/257; 264/510; 264/511; 264/258; 264/259; 264/261; 264/328.1; 264/328.7; 264/265; 264/266; 425/DIG. 223
[58] Field of Search ............... 264/511, 258, 264/259, 261, 328.1, 328.7, 510, 257, 265, 266; 425/DIG. 223

[56] References Cited

U.S. PATENT DOCUMENTS

| 2,165,762 | 7/1939 | Reid | 264/279 |
| 2,182,389 | 12/1939 | Reid | 264/279 |
| 2,207,600 | 7/1940 | Seaver | 264/257 |
| 3,906,066 | 9/1975 | Barrie | 264/45.5 |
| 4,052,497 | 10/1977 | Monnet | 264/255 |
| 4,210,616 | 7/1980 | Eckardt et al. | 264/255 |
| 4,259,274 | 3/1981 | Tiitola | 264/261 |
| 4,489,033 | 12/1984 | Uda et al. | 264/328.7 |
| 4,758,395 | 7/1988 | Zion | 264/135 |
| 5,114,762 | 5/1992 | Bontems et al. | 264/257 |
| 5,130,075 | 7/1992 | Hara et al. | 264/328.7 |
| 5,164,144 | 11/1992 | Rose | 264/511 |

(List continued on next page.)

FOREIGN PATENT DOCUMENTS

| 2422493 | 12/1979 | France | 264/511 |
| 1162317 | 7/1986 | Japan | 264/511 |
| 2184823 | 8/1987 | Japan | 264/511 |
| 3078716 | 4/1988 | Japan | 264/511 |
| 2-25806 | 6/1990 | Japan . | |
| 3-60297 | 9/1991 | Japan . | |
| 5-83056 | 11/1993 | Japan . | |

*Primary Examiner*—Jan H. Silbaugh
*Assistant Examiner*—Robin S. Gray
*Attorney, Agent, or Firm*—Flynn, Thiel, Boutell & Tanis, P.C.

[57] ABSTRACT

A method of producing a laminated molding, such as an air current control valve used in an air conditioner for a vehicle, is made to be united with an facing material having the flexible surface of a basic plate made of resin. When the above laminated molding is produced, a used mold should be split into a stationary mold portion and a movable mold portion. Also, a compression core is provided in the movable mold portion. The facing material is temporarily fixed on a mold-face of the stationary mold portion and a mold-face of the compressive core of the movable mold portion opposite the mold-face of the stationary mold portion, during the aforementioned state, a melting synthetic resin is fed into a mold and then the fed melting synthetic resin is compressed by moving the compression core toward the stationary mold portion. By compressing the compression core, it makes a space providing a larger volume than a molding in the cavity which is being fed with the melting synthetic resin; this allows the melting synthetic resin to be quickly fed under a high injection pressure, whereby each cycle process takes place in a shorter time. Furthermore, after the melting synthetic resin is filled in the cavity, the pressure force exerted on the compression core is capable of being decreased, without the flexible facing material being damaged.

16 Claims, 18 Drawing Sheets

U.S. PATENT DOCUMENTS

| | | | |
|---|---|---|---|
| 5,178,708 | 1/1993 | Hara eta l. ............................... | 264/259 |
| 5,178,815 | 1/1993 | Yokote et al. ........................... | 264/259 |
| 5,281,376 | 1/1994 | Hara et al. . | |
| 5,283,028 | 2/1994 | Breezer et al. ......................... | 264/511 |
| 5,308,570 | 5/1994 | Hara et al. ............................... | 264/259 |
| 5,352,397 | 10/1994 | Hara et al. ............................... | 364/259 |
| 5,356,588 | 10/1994 | Hara et al. ............................... | 264/259 |
| 5,543,094 | 8/1996 | Hara et al. ............................... | 264/259 |
| 5,690,881 | 11/1997 | Horie et al. ............................. | 264/263 |

F I G. 2(A)
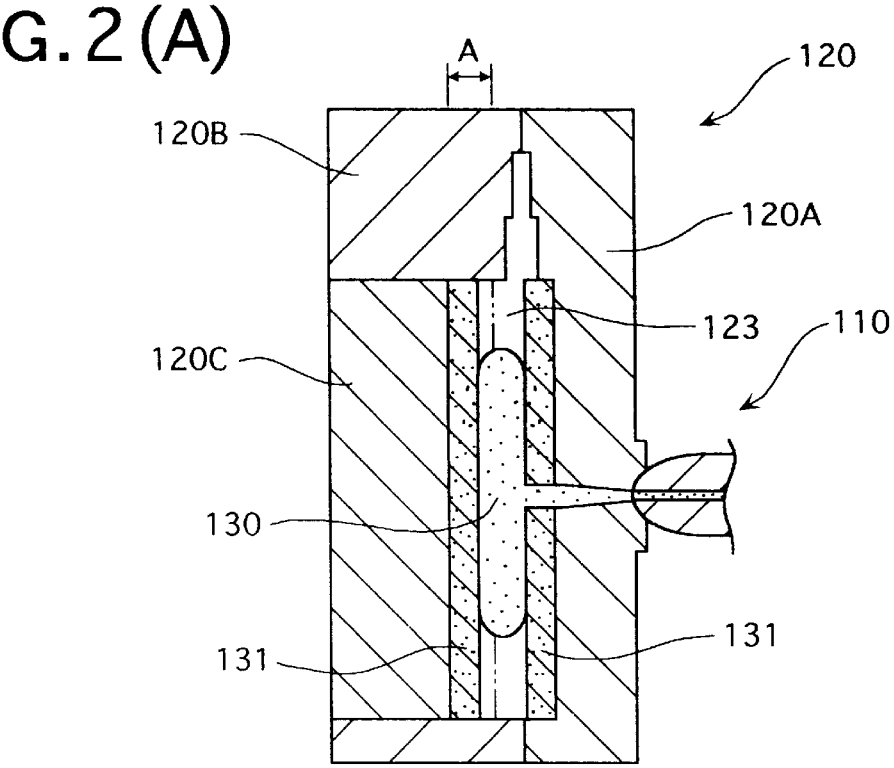
F I G. 2(B)
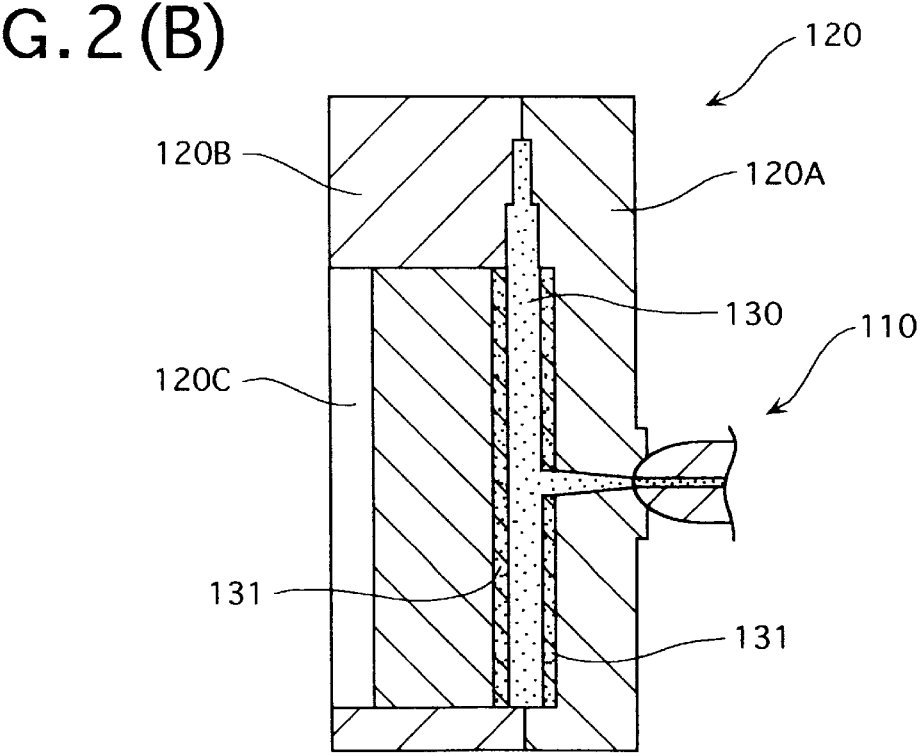

F I G. 15(A)
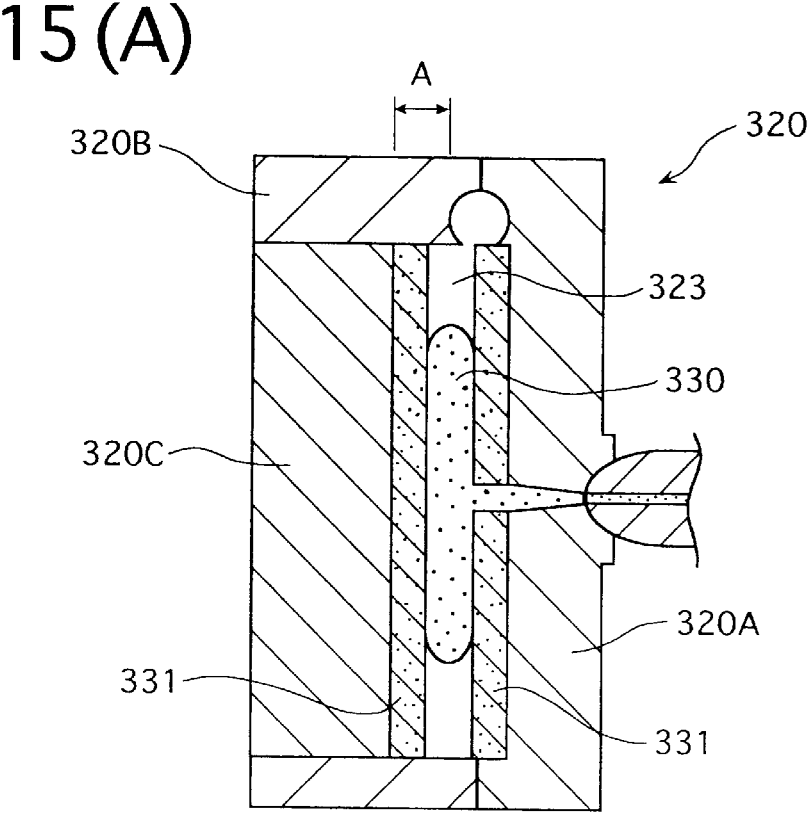
F I G. 15(B)
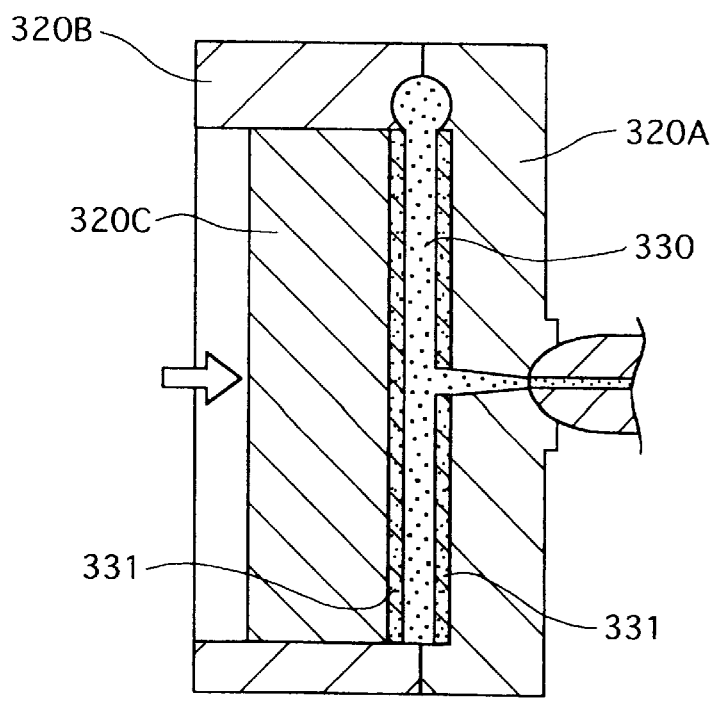

METHOD OF PRODUCING A LAMINATED MOLDING

BACKGROUND OF THE INVENTION

1. Field of the Invention

This invention relates to a method of producing a laminated molding united with an facing material on its surface.

2. Description of the Related Art

Conventionally, a laminated molding united with a flexible facing material on its surface has been known and used for a car interior ornament such as a sun-visor and a headrest or an air current control valve used in an air conditioner for a vehicle. According to the aforementioned laminated molding, its surface is covered with the facing materials having flexibility, therefore, a nice feel can be afforded when, for example, a hand touches with the surface and further decorativeness can be afforded when fabric is used as the facing material.

Since an increase in the thickness of the facing material enables the facing material to have fine cushioning properties, if the laminated molding is used for a cover of a console-box and so on, noise generating when closing it, vibration in driving and so on can thus be controlled.

Furthermore, since the facing material having the cushioning properties is capable of sealing a gap, using the laminated molding for the air current control valve of the air conditioner for the vehicle, fine sound insulation, sealing state and so on can be afforded to the air current control valve.

Following method can be used for producing the laminated molding.

A. A method of producing to adhere the facing materials with adhesives and so on to the surface of the molding produced by an injection mold, previously.

B. A method of producing by a compress mold which compresses a melting synthetic resin fed into a cavity in a state of clamping between the two facing materials adhered with an impregnated prevention sheet (Japanese Patent Application Publication No. 2-25806).

C. A method of producing with the injection mold which the melting synthetic resin controlled relatively at low degree of an injection pressure is fed between the two facing materials after the mold preparing the two facing materials therein is completely closed, and at the same time, the fed melting synthetic resin is cooled and solidified in a low temperature under a retained pressure, relatively (Japanese Patent Application Publication No. 3-60297).

D. A method of producing with an injection compress mold which the melting synthetic resin is fed between the two facing materials before the mold preparing the two facing materials are clamped, and the mold fed completely with the melting synthetic resin is clamped (Japanese Patent Application Publication No. 5-83056).

The aforementioned producing methods A–D have respectively the following disadvantages a–d.

a. Disadvantages are that productivity becomes low by reason of an adhering process taking a long time, because each molding should be adhered with the facing materials one by one, and considering a disadvantage as for degeneration of a work environment, sufficient adhesive strength cannot be obtained by adhering with adhesives.

b. Disadvantages are that cycle time of molding processes for each molding becomes longer, because an extruder nozzle of feeding with the melting synthetic resin into the mold is required to move to and form the inside of the mold, whenever the melting synthetic resin is fed, and since the facing materials should be adhered with an impregnated prevention sheet, this results in an increased production time.

c. Disadvantages are that since the injection pressure is controlled at relatively low degree, it takes a long time to feed with the synthetic resin, whereby cycle time of molding processes becomes longer.

On the other hand, if the injection pressure is controlled at high pressure, the cycle time of the molding process can be shorter. Other disadvantages, whereby the quality of the facing materials become inferior, are produced by the following difficulties.

① The facing materials are pushed in a horizontal direction, so that the surface of the facing materials wrinkle.

② When the grained facing materials are used, an uneven pattern grained on the facing materials, result in the disorderly grained pattern.

③ When a fabric sheet is used as the facing materials, filaments on the fabric sheet are lain down, resulting in a rougher surface.

④ When the thick facing materials are used, the facing materials are crushed so that their fine cushion property is lost.

d. Disadvantages are that quality of the facing materials become inferior, producing the same difficulty as the aforementioned ① to ④, because the melting synthetic resin is molded by clamping the mold, so that the large compressive force is required to be continually added to the melting synthetic resin and the facing materials in the mold until a molding process completes, with the result that the facing materials are strongly pressed with the high compressive force.

It is an object of the present invention to provide the method of producing the laminated molding, in which the molding time in a cycle of the process is shorter and further quality of the facing materials is not inferior.

SUMMARY OF INVENTION

The present invention, which is a method of producing a laminated molding unitedly attached to a flexible facing material on at least one side, is characterized by including the steps of a process to feed a melting synthetic resin onto the opposite side of the facing material closely attached to the mold-face after the facing material is temporarily and closely attached to at least one mold-face of mutually facing mold-faces in a mold and then the mold is incompletely closed to secure a predetermined compression margin; a process to fill the whole mold with the melting synthetic resin is done by feeding the melting synthetic resin into the mold by compressive force. This is produced by clamping the mold; and by a process to decrease the compressive force that is added to the melting synthetic resin after it is filled.

It is advisable to increase, before the melting synthetic resin is solidified completely, the compressive force once decreased after the melting synthetic resin is filled in the whole mold.

And, it is desirable that the facing material is temporarily fixed in the mold by means of a vacuum suction means having pins projecting on the mold-face in the mold and/or suctorial ports opened on the mold-face.

Furthermore, it is advisable that the melting synthetic resin is fed between the outer-faces fixed temporarily on the mold-faces after the mold is closed while the facing materials are temporarily fixed to attach to the mutually facing sides of the mold-faces in the mold.

Incidentally, the size of the facing material can be selected in response to use and function of the laminated molding; for example, the facing material completely covering both sides of the laminated molding, completely covering one side of the laminated molding, alternatively partly covering both sides of the laminated molding, or even partly covering the one side of the laminated molding.

It is advisable to use a face material having fine cushioning properties as the facing material when the laminated molding is used for an air current control valve of an air conditioner of a vehicle.

According to the aforementioned method of producing; the following material, molding apparatus and molding steps can be employed.

(1) MOLDING MATERIAL

As a synthetic resin for molding. Thermoplastic resins such as polyethylene, polypropylene, polystyrene, ABS (acrylonitrile-butadien-styrene), polycarbonate, polyamide, and resin resulted from adding filler such as ethylene-α-olefin copolymer, styrene-diene copolymer or elastomer class as hydrogenous additions of the copolymer, talc, calcium carbonate, mica and glass fiber to such thermoplasticity resin can be employed.

As the facing material, cloth such as non-woven fabric and woven fabric, thermoplasticity resin material, foaming material made of thermoplasticity resin, a single-layer material such as film printed with a pattern and so on, and a multilayer member lined with a material consisting of thermoplastic foamed material, thermoplasticity or the like to an outer material made of thermoplastic elastomer, vinyl chloride resin or the like can be employed.

Especially, as the facing material used for the air current control valve of the vehicle's air conditioner containing, a cushion surface-member made of foamed member of polyurethane, polyethylene, polypropylene, polystyrene and so on can be used.

(2) MOLDING APPARATUS

As a molding apparatus, an injection compression molding apparatus including a compression system capable of controlling the compressive force of the mold at more than three steps when the compressive force is added can be employed.

The compression system can be, for example, provided on the inside of the mold, included in the injection molding apparatus and positioned between the mold and a movable die-plate included in a clamping device of the injection molding apparatus.

The mold, which can be used, for example, has a stationary mold portion and a movable mold portion that can be clamped in order to compress the melting synthetic resin fed therein, and has the stationary mold portion and the movable mold portion; besides the compression core provided in the stationary mold portion to compress the melting synthetic resin fed therein.

When the mold having the compression core is used, portions prepared with the facing material in the mold can be assigned on the mutually facing mold-faces of the stationary mold portion and the compression core whilst portions non-prepared with the facing material in the mold can be assigned on the other part of the mold-face of the stationary mold portion and the mold-face of the movable mold portion. In this case, since the compressive force caused by the compression core is adapted to add to the facing material directly, force compressing against the facing material is adjusted bit by bit.

(3) STEPS FOR MOLDING

When the molding is molded by the aforementioned molding apparatus or the like, the following steps can be employed.

① Each facing material is affixed to the inside of the mold-face opposite one another in the mold of the opening state.

Incidentally, when the affixed facing material closes a gate to feed with the melting synthetic resin; previously, a hole was opened at a position on the facing material affixed on a secured mold side to correspond with the position of the gate. Therefore, the melting synthetic resin can be fed through the hole on the facing material into the mold.

② When the mold closes, a movable half-member of the mold stops moving before it reaches a completely closed state with a predetermined interval to secure the compression margin in order not to be reversed and not to be opened any more.

③ The melting synthetic resin is fed into the mold by driving an injection device.

④ Just before or after the finishing feed, a compression process to add the compressive force to the inside of the mold starts to cause the melting synthetic resin in the mold to be filled with spreadability by the compressive force.

⑤ Just after the resin is filled throughout the mold, the compressive force adding to the mold is decreased.

⑥ After a surface temperature of the resin is decreased, before the melting synthetic resin is solidified, the compressive force adding the mold is increased again to cause the resin in the mold to maintain its predetermined configuration.

⑦ After the resin is cooled and solidified, the mold is opened to take out the molding.

⑧ After finishing the injection, a preparative plasticization is started for the next injection molding.

Incidentally, in the case of using the facing material possessing the cushioning properties, a hole opened on the facing material at a position corresponding with a gate. The part around the hole opened on the facing material is to be stretched in which the melting synthetic resin fed into the mold presses the facing material, whereby it is possible that the molded molding is effected to be in a state of involving the melting synthetic resin around the hole on the facing material.

In this case, the following step ⑨ may be employed instead of the aforementioned steps ②, ③.

⑨ While the mold is almost closed and the facing material is compressed to an extent that the melting synthetic resin is not deformed or not to be spread by compression, the melting synthetic resin starts feeding into the mold. After the melting synthetic resin is filled to an extent that the melting synthetic resin covers at least the hole opened on the outer-face to correspond with the gate, a predetermined compression margin is secured by opening the mold while the feed of the melting synthetic resin is continued as it is, and then the feed of the melting synthetic resin is finished.

Thus, the compressed facing material is sufficiently congested not to be deformed by the compressing force of the melting synthetic resin, with the result that the melting synthetic resin is prevented from being involved.

In the present invention as stated thus far, the molding is molded, though a process is used to compress the melting synthetic resin fed into the mold by reducing the volume of the inside of the mold, concretely, the incompletely closed mold can be clamped completely or the backed compression core can be moved to the movable mold portion. This facilitates a process to feed the melting synthetic resin before the compression process, a space having a larger volume than the molding is formed in the mold. Before the feed of the melting synthetic resin is advanced, the internal pressure of the fed melting synthetic resin is increased remarkably, a space is formed in the larger volume than the molding inside of the mold.

Therefore, when the melting synthetic resin is fed into the mold at an increased injection pressure, the melting synthetic resin in the mold does not result in high pressure because of the aforementioned space capable of spreading the melting synthetic resin in the mold. Therefore, the melting synthetic resin does not compress the facing material forcibly.

Before the mold is completely filled with resin, even if the melting synthetic resin is added in the compressive force by, for example, clamping the mold, the compressive force does not forcibly compress the facing material, because the compressive force acts to force the melting synthetic resin to spread fluidity in the whole mold.

And, after the resin has completely filled in the mold, the result is the facing material is sandwiched between the resin and the mold, the compressive force compressing the mold becomes a force compressing the facing material as it is, but at this time, the compressive force caused by clamping the mold is already decreased, whereby the facing material does not compress strongly.

Therefore, the injection pressure is defined as high pressure, so that the melting synthetic resin is fed quickly and a cycle process can be facilitated for a short time, on the other hand, even if the injection pressure is defined as high pressure, the facing material does not compress strongly, whereby the aforementioned objective is achieved.

Incidentally, when the surface of the melting synthetic resin is cooled to a certain extent, penetration of the melting synthetic resin for the facing material and dissolution of the facing material are restricted, so that disadvantages such as damage inflicted on the facing material are not produced even if the compressive force added to the mold is increased. Therefore, if the compressive force to the mold is increased again, before the whole melting synthetic resin is completely solidified, the quality of the facing material is not effected. Furthermore, the cooling time of the resin can be shorter and the time needed for facilitating a cycle of the process is also shorter.

BRIEF DESCRIPTION OF THE DRAWINGS

FIG. 2(A) and FIG. 2(B) are explicative diagrams of a molding process in the first embodiment;

FIG. 15(A) and FIG. 15(B) are explicative diagrams of a molding process in the fifth embodiment;

FIG. 20(A) is a diagram of the state of the mold as the resin feed step is initiated in the sixth embodiment;

DETAILED DESCRIPTION OF THE REFERRED EMBODIMENT(S)

FIRST EMBODIMENT

A first embodiment of the present invention will be explained in accordance with the attached drawings.

Figure 1:
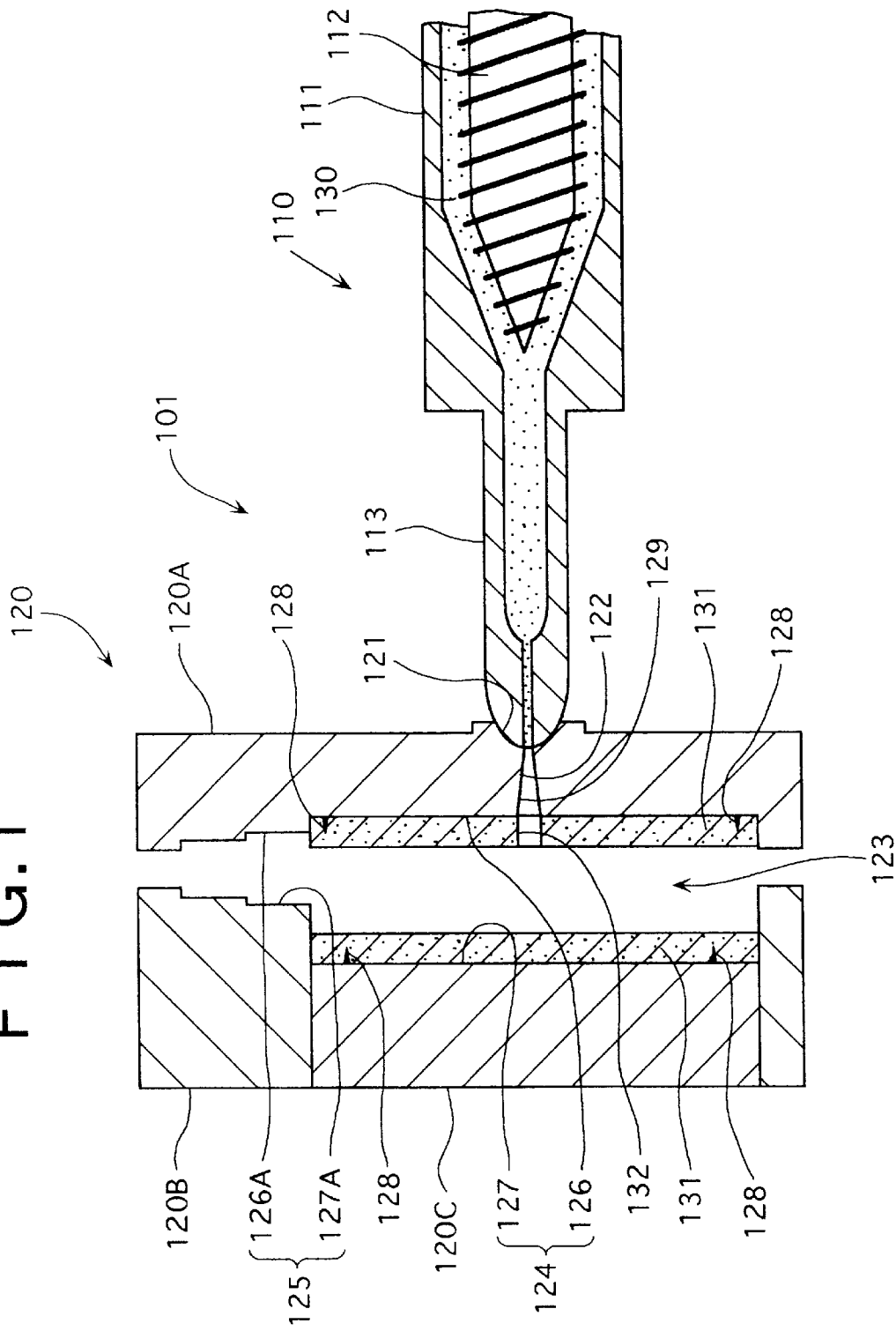
FIG. 1 is a fragmentary sectional view of an injection molding apparatus of a first embodiment according to the present invention.

FIG. 1 illustrates fragmentarily, an injection compression molding apparatus 101 of a first embodiment according to the present invention. The injection compression molding apparatus 101 includes an injection device 110 injecting a melting in other words, molten, synthetic resin 130 and a mold 120 for molding.

The injection device 110 consists of a screw 112 to squeeze kneadingly the melting synthetic resin 130 into a barrel 111. At the forward end of the barrel 111, there is a nozzle oriented 113. The nozzle 113 connects to a bush 121 in the mold 120 to inject the resin 130 into the mold 120, so that the melting synthetic resin 130 is adapted to be fed into the mold 120.

The mold 120 is comprised of a stationary mold portion 120A on the right side of the drawing, a movable mold portion 120B on the left side, and a compression core 120C oriented to be capable of moving forward and backward in the movable mold portion 120B.

The stationary mold portion 120A is fixed in the injection compression molding apparatus 101, thus rendering it immovable. In the stationary mold portion 120A, a sprue 122 leads the resin 130 into the mold 120 to pass through the central area of the stationary mold portion 120A as well as the bush 121 is provided.

The movable mold portion 120B is movably oriented in the injection compression molding apparatus 101.

In the left side of the movable mold portion 120B of the drawing, there is a clamping device that cannot be seen. The clamping device urges the movable mold portion 120B to move toward the stationary mold portion 120A, with the result that the mold 120 is closed.

The compression core 120C compresses the melting synthetic resin 130 fed into the mold 120. In the left side of the compression core 120C of the drawing, there is a compressing device that cannot be seen.

The compressing device urges or backs the compression core 120C to move toward or away from the stationary mold portion 120A, which the compress force is facilitated to be able to adjust continuously within a range 0–100% of maximum extrusive pressure.

Furthermore, the stationary mold portion 120A, the movable mold portion 120B and the compression core 120C form a cavity 123 including an adhesion portion 124 on which an facing material 131 is to be placed and a non-adhesion portion 125 on which the facing material 131 is not to be placed.

The adhesion portion 124 is assigned on mutually facing mold-faces 126, 127 of the stationary mold portion 120A and the compression core 120C. The adhesion portion 124 is provided thereon with plural pins 128 as a fastener means of fastening the facing material 131. Those pins 128 are projected from the mold-faces 126, 127 to fasten the facing materials 131 on the stationary mold portion 120A and compression core 120C.

The non-adhesion portion 125 is assigned on mutually facing mold-faces 126A, 127A of the stationary mold portion 120A and the movable mold portion 120B, which are located on the upper of the adhesion portion 124 shown in the drawing. The non-adhesion portion 125 facilitates to form the molding, having a portion, on which, the facing material 131 is not covered, for example, another part which needs a portion of the non-covered facing material 131 in order to connect with the other molding.

The facing material 131 is of a thick foaming sheet having the cushioning properties. The facing material 131 prepared in the stationary mold portion 120A includes a through-hole 132 at a position corresponding to a direct-gate 129 as an exit of the sprue 122 oriented at the central area of the mold-face 126. The melting synthetic resin 130 is to be fed through the direct-gate 129 and the through-hole 132 into the cavity 123C.

In this embodiment, the injection compression molding will be facilitated with the following process.

First, the mold 120 is opened to prepare the facing materials 131 on the mold-faces 126, 127 of the stationary mold portion 120A and the compression core 120C respectively, and the mold 120 is then closed.

At this moment, the compression core 120C still remains at a back position to secure a compression margin A as a distance for which the compression core 120C can move in a compression process as shown in FIG. 2 (A), and the injection device 110 is driven to start a feed process to feed the melting synthetic resin 130 to the inner cavity 123 of the mold 120.

And, just before or after finishing the feed process, the clamping device is driven to start a compression process to add compressive force to the melting synthetic resin 130, which is fed to the inner cavity 123 by moving the compression core 120C for the compression margin A as shown in FIG. 2(B).

Furthermore, in the compression process, three processes take place in order, these three processes are a filling process filling up the whole cavity 123 with the melting synthetic resin 130 with a spread, a protection process decreasing the compressive force added to the melting synthetic resin 130, and a pressure retainment process increasing the compressive force added to the melting synthetic resin 130.

More specifically, in the filling process, the melting synthetic resin 130 is spread to every corner of the cavity 123 by advancing the compression core 120C. At that time the melting synthetic resin 130 completely reaches to every corner of the cavity 123, the filling process is then finished.

No sooner is the filling process finished than the protection process, which decreases the compressive force added to the melting synthetic resin 130, is started in order to protect the facing material 131 from damage caused by compression.

During the protection process, the surface of the melting synthetic resin 130 is cooled until the temperature of the facing material 131 remarkable does not suffer from being melt. After sufficiently cooling the surface of the melting synthetic resin 130, the protection process is finished and the pressure retainment process starts increasing the compressive force in order to cool and solidify the melting synthetic resin 130.

In the pressure retainment process, the melting synthetic resin 130 is cooled and solidified under sufficient compressive force to cause the melting synthetic resin 130 to maintain a predetermined shaped configuration. At that time the melting synthetic resin 130 is cooled and solidified sufficiently, the pressure retainment process finishes and the mold is opened to take out the finished molding. At the completion of the injection process, a plasticization process for plasticizing a newly fed melting synthetic resin 130 will be naturally started for the next injection molding.

According to the previously described system, each degree of the compressive force in the filling process, the protection process and the pressure retainment process is previously defined before carrying out the injection compression molding. Set points in the aforementioned processes are respectively assigned as set points SP1, SP2 and SP3 which will be determined as follows:

In particular, the set point SP1 in the filling process is defined at a sufficiently high pressure value to be able to spread the melting synthetic resin 130.

The set point SP2 in the protection process is defined at a sufficiently low pressure value to cause the facing material 131 to be protected from suffering damage caused by compression.

The set point SP3 in the pressure retainment process is defined at the relative higher pressure value capable of causing the melting synthetic resin 130 to remain at the predetermined configuration shape, by compressing the melting synthetic resin 130 against both sides of the mold-faces 126, 127.

The comparative force of each of the set points SP1, SP2 and SP3 is SP1>SP3>SP2.

According to the embodiment, the following effects will be described.

The injection pressure is increased in the feed process in order to feed the melting synthetic resin 130 quickly, and further, in the filling process in the compression process, the larger compressive force is added to the melting synthetic resin 130 in order to spread the melting synthetic resin 130 quickly, whereby, it can take a shorter time to mold one molding in a cycle of the process.

Furthermore, since the mold 120 has a space inside with a larger volume than the molding when the compression core 120C being to be advanced in the compression process still remains at the initial position in the feed process, which the melting synthetic resin 130 is fed, the melting synthetic resin 130 does not crush down the facing material 131 even if the melting synthetic resin 130 is fed into the mold 120 under a higher injection pressure, whereby the facing material 131 can be prevented from suffering damage during the feed process.

Again, the facing material 131 does not suffer being crushed even if the melting synthetic resin 130 is compressed in the filling process in which the melting synthetic resin 130 still remains in the spreadable state. The large compressive force therefore is adapted to add to the melting synthetic resin 130 in the filling process, however, the facing material 131 suffers from crushing when the melting synthetic resin 130 is compressed in the protection process in which the melting synthetic resin 130 already loses the spreadable state, so that the compressive force added to the melting synthetic resin 130 is to be decreased in the protection process. Therefore, the facing material 131 never suffers the crushed damage in either the filling process nor the protection process. Consequently, the facing material 131 can be prevented from suffering severe damage.

Consequently, the facing material 131 maintains its quality, such as its cushioning properties. Furthermore the injection compression molding can be facilitated in a shorter time in a cycle process.

The adhesion portion 124, which the facing material 131 is to be placed thereon in the mold 120, is defined by the mutually facing mold-faces 126, 127 of the stationary mold portion 120A and the compression core 120C, to facilitate to an added pressure force caused by the compression core 120C to the facing material 13 1 directly, so that the pressure force for the facing material 13 1 can be adjusted bit by bit, and further the pressure force for the facing material 131 is suitably decreased in the protection process, with the result that the facing material 131 can be reliably protected from damaging.

In the pressure retainment process which the cushioning properties of the facing material 131 dose not suffer apprehensible damage from heat by the melting synthetic resin 130 because of the surface of the melting synthetic resin 130 already cooled, the melting synthetic resin 130 is cooled and solidified under the increased compressive force again, whereby the cushioning properties of the facing material 131 are not inferior and the time for cooling the melting synthetic resin 130 is shorter. In brief, the injection compression molding can be facilitated in a shorter time in a cycle process.

SECOND EMBODIMENT

Figure 3:
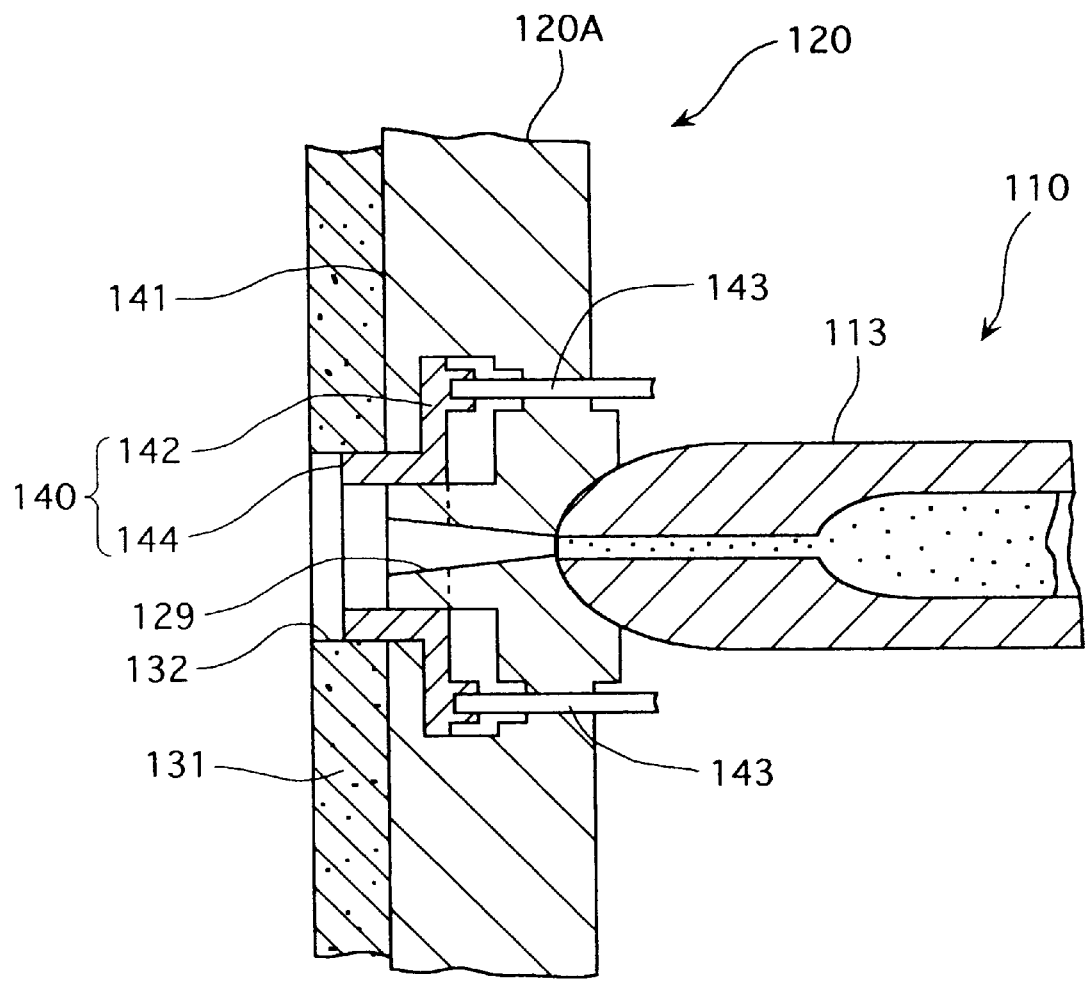
FIG. 3 is a fragmentary sectional view of a second embodiment according to the present invention.

FIG. 3 shows a second embodiment according to the present invention. In the embodiment, a mold-face 141 having a wall portion 140 projecting from the stationary mold portion 120A that surrounds around the direct-gate 129 replaces the flat mold-face 126 of the stationary mold portion 120A in the aforementioned first embodiment.

More specifically, the wall portion 140, which has a cylindrical shape including a collar portion 142 at its basic end in the mold 120A, is adapted to move between the inside and the outside of the stationary mold portion 120A in a vertical direction to the apparatus. The collar portion 142 is fixed at the end of a rod 143 which transfers the driving force delivered from the outside. The rod 143 is reciprocated in a vertical direction to the nozzle 113 by a driving device (not-shown) such as a hydraulic cylinder device, whereby an end portion 144 of the wall portion 140 is adapted to forcibly project on the mold-face 141.

When the facing material 131 is prepared in the mold 120, the end portion 144 of the wall portion 140 is projected from the mold-face 141 to enter in the through-hole 132 of the facing material 131. At the time the filling process finishes or just before the filling process finishes, the end portion 144 sinks in the stationary mold portion 120A, so that the side face of the end portion 144 becomes flush with the surface of the mold-face 141.

The embodiment can obtain the effects and the action similar to the first embodiment, and in addition, an fine appearance of the produced molding results, because the end portion 144 of the wall portion 140 closes the outside face of the through-hole (of the right side in the drawing) of the facing material 131 in the feed process, therefore, the melting synthetic resin 130 fed in the mold is not crowded out of the through-hole 132 of the facing material 131.

On the other hand, at the time or just before the filling process finishes, the end portion 144 of the wall portion 140 sinks in the stationary mold portion 120A, so that deformation caused by the wall portion 140 surrounding the direct-gate 129 is not formed on the molding. Therefore, the embodiment can add another effect which the uniform thickness of the melting synthetic resin 130 causes the strength of the molding to be prevented from decreasing by a thin part produced with deformation and so on.

PRACTICAL EXAMPLE 1

Now, the effects of the present invention will be explained in accordance with concrete practical examples.

The practical example 1 is of an experiment with molding the laminated molding in accordance with the aforementioned first embodiment.

Figure 4:
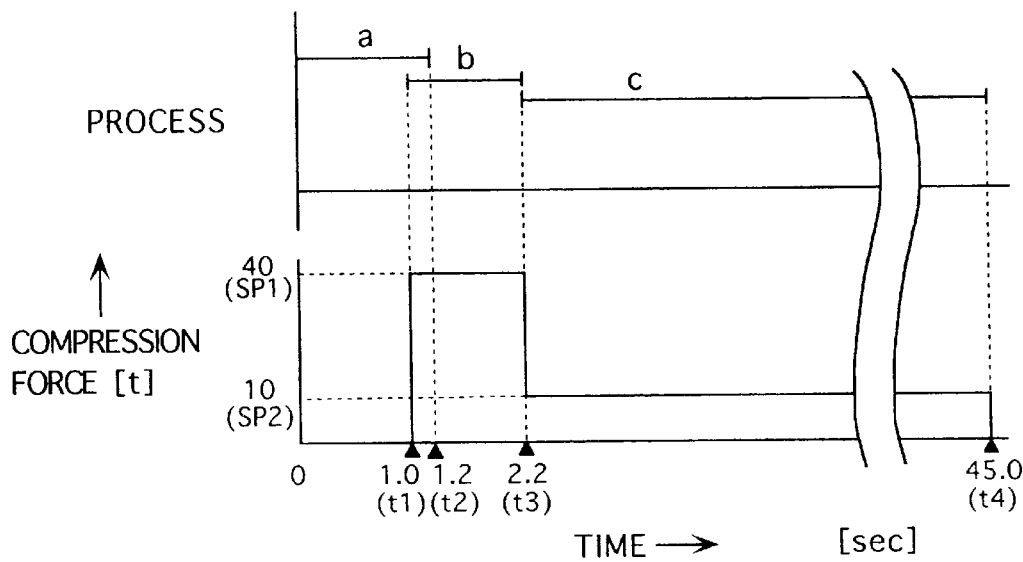
FIG. 4 is an explicative diagram of a molding process in practical example 1 according to the present invention.

In the practical example 1, the feed process a, the filling process b and the protection process c are performed in order as shown in FIG. 4. The melting synthetic resin 130 undergoes retainment of pressure in the protection process c of all processes, and the independent pressure retainment process is omitted.

Following are timings for starting and completing each of the processes a–c and the set points of the compressive force and so on through each of the processes b, c.

Incidentally, a starting time t0 of the feed process a is defined as a standard time (t0=0 sec.), timings for starting and completing each of the processes a–c is indicated as a passing time (sec.) passing from the start of the feed process a.

| | |
|---|---|
| Starting time t1 of the filling process b | 1.0 sec. |
| Completing time t2 of the feed process a | 1.2 sec. |
| Starting time t3 of the protection process c (Completing time of the filling process b) | 2.2 sec. |
| Completing time t4 of the protection process c | 45.0 sec. |
| Set point SP1 of the compressive force in the filling process b | 40 ton |

-continued

| | |
|---|---|
| Set point SP2 of the compressive force in the protection process c | 10 ton |

PRACTICAL EXAMPLE 2

Figure 5:
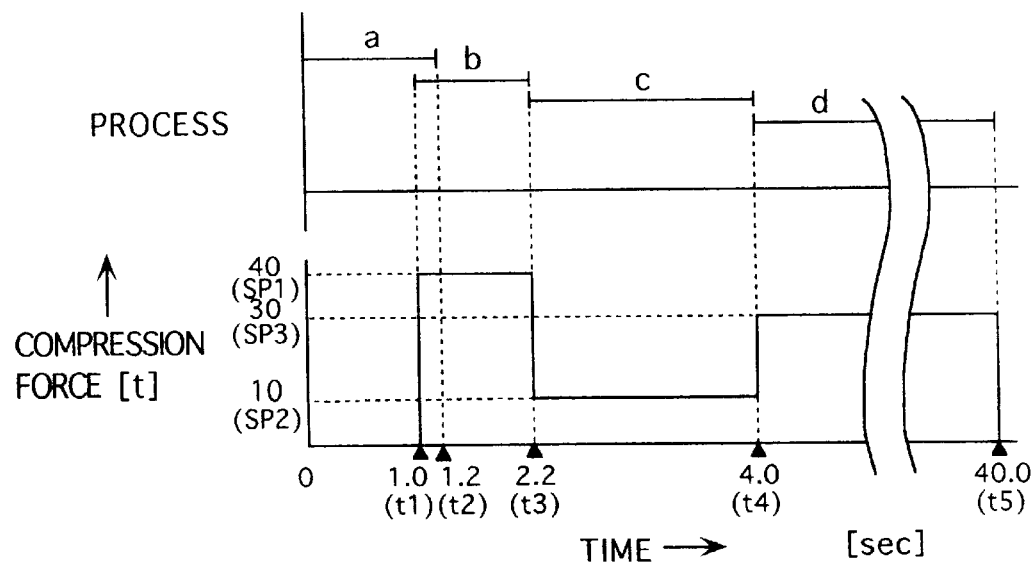
FIG. 5 is an explicative diagram of a molding process in practical example 2 according to the present invention.

The practical example 2 is of an experiment with molding the laminated molding by adding the pressure retainment process d to the aforementioned practical example 1. In the practical example 2, the feed process a, the filling process b, the protection process c and the pressure retainment process d are performed in order as shown in FIG. 5.

Following are timings for starting and completing each of the processes a–d and the set points of the compressive force and so on through each of the processes b–d.

| | |
|---|---|
| Starting time t1 of the filling process b | 1.0 sec. |
| Completing time t2 of the feed process a | 1.2 sec. |
| Starting time t3 of the protection process c (Completing time of the filling process b) | 2.2 sec. |
| Completing time t4 of the protection process c (Starting time of the pressure retainment process d) | 4.0 sec. |
| Completing time t5 of the pressure retainment process d | 40.0 sec. |
| Set point SP1 of the compressive force in the filling process b | 40 ton |
| Set point SP2 of the compressive force in the protection process c | 10 ton |
| Set point SP3 of the compressive force in the pressure retainment process d | 30 ton |

COMMON INJECTION CONDITION

Both of the practical examples 1 and 2 are performed with the following materials, apparatus, molding condition and so on to mold the molding.

(1) MATERIALS

A synthetic resin consisting of the molding, polypropylene: MI 55 g/10 min., 230° C., 2.16 kgf (a brand name: IDEMITSU Polypro J-5050H by IDEMITSU PETROCHEMICAL CO., LTD.) is employed.

In the practical example 1, the facing material is made by using non-woven fabric having the thickness of 2.0 mm and made of polyester. On the other hand, in the practical example 2, the facing material is made by using a laminated sheet material having the thickness of 3.0 mm, which the laminated sheet material is unitedly composed of an outer layer made of vinyl chloride resin and a foamed member made of polypropylene.

(2) MOLDING APPARATUS

As for the molding apparatus, an apparatus accompanying a movable die-plate of a general horizontal injection molding apparatus (the maximum clamping force: 200 ton, by TOSHIBA MACHINE CO., LTD.) with the compression device of a hydraulic driving type is used.

(3) MOLD

Figure 6:
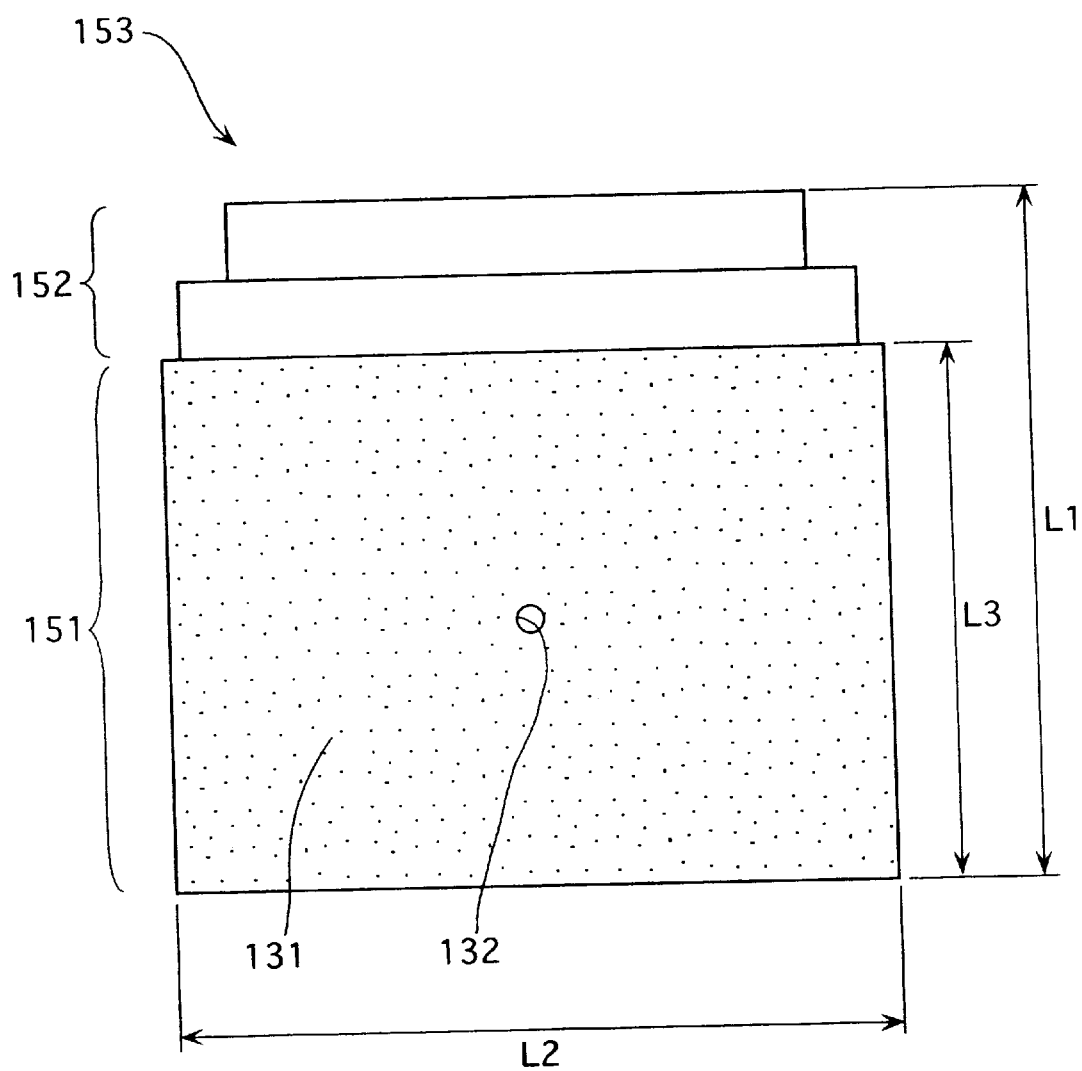
FIG. 6 is a front view of a molding molded in practical examples 1, 2.

With regard to the mold, the used mold 120 is adapted to include the cavity 123 in order to form the molding 153 having a laminated portion 151 shaped into a quadrangle and covered with the facing material 13 1 and a stairs portion 152 having a bare resin because of the non-covered facing material 131 as shown in FIG. 6.

Incidentally, the stairs portion 152 of the molding 153 plays a role as a connection portion in which the molding 153 connects another molding through the stairs portion 152 fitted into a concave portion formed on the other molding to correspond with the configuration of the stairs portion 152.

A length measurement L1 and a lateral measurement L2 of the molding 153 are respectively defined as 100 mm and 200 mm. Thickness of the solely resin portion excluding thickness of the facing material 131 of the laminated portion 151 is defined as 4.0 mm.

(4) MOLDING CONDITION

| | | |
|---|---|---|
| ① | Molding temperature | 200° C. |
| ② | Mold temperature | 40° C. |
| ③ | Injection pressure of resin | 80 kg/cm² (gauge pressure) |
| ④ | Compressive degree of the compression core | 30 mm |
| ⑤ | Moving speed of the compression core | 10 mm/sec. |

COMPARATIVE EXAMPLE 1

In order to ascertain the effects of the present invention, the comparative example is conducted to obtain the same molding as the aforementioned practical example 1 with an injection molding method of the conventional art.

The comparative example is performed with the same materials and devices as the practical example 1, but in the comparative example, the melting synthetic resin 130 is fed into the mold 120 at a higher injection pressure than the practical example 1 to mold.

Concretely, the molding is molded by the following steps; first, the melting synthetic resin 130 is fed for 2.0 seconds at the injection pressure from the injection device 110 defined as 100 kg/cm², and the melting synthetic resin 130 is further fed for 5.3 seconds with the injection pressure increased to 200 kg/cm², and then, the melting synthetic resin 130 is retained to receive pressure for 5.0 seconds at the retained pressure defined as 400 kg/cm².

RESULT OF EXPERIMENTS (1) The molding obtained in the practical example 1 results in the facing material 131 not suffering very much from the crushed damage and the thickness of the facing material 131 becoming 1.7 mm slightly reduced by 0.3 mm. There is no disadvantage on the facing material 131, for example, standing fibril on the facing material is squashed horizontally or the edge of the facing material is folded back.

Considering the reason stated thus far, according to the practical example 1, it is understood that fine molding 153 can be obtained.

(2) The molding obtained in the practical example 2 results in the thickness of the facing material 131 becoming 2.4 mm slightly reduced by 0.6 mm. Although the completing time of the mold is five seconds earlier than the practical example 1, the facing material 131 can sufficiently retain its cushioning properties, and further, there is no disadvantages such as pits and ugly grain on the facing material 131.

From the reason stated above, according to the practical example 2, it is understood that the fine molding 153 can be obtained, and besides, the time taken to mold the cycle processes can be shorter.

(3) The molding obtained in the comparative example 1 results in the thickness of the facing material 131 having a remarkable decrease, down to 1.1 mm reduced by 0.9 mm to almost half thickness, and further disadvantages are produced, for instance, standing fibril on the facing material is squashed horizontally and the edge of the facing material 131 is involved with the bulged resin. Consequently, the appearance of the facing material 131 is inferior along with the other disadvantages stated. Clearly, the fine molding 153 is not obtained in the comparative example 1.

Although the present invention has been disclosed in detail by referring to particular preferred practical examples and comparative example, it should be understood that the present invention is not intended to be limited to the aforementioned practical examples and comparative example, and various changes and modifications on design may be made therein without departing from the spirit of the present invention.

For example, as synthetic resin composing the molding, not only polypropylene but also thermoplasticity resin such as polyethylene, polystyrene, ABS, polycarbonate, or resin resulted from adding filler such as talc, calcium carbonate, mica and glass fiber to such thermoplasticity resin may be used.

As the facing material, the laminated sheet composed of an outer layer made of vinyl chloride resin or non-woven fabric of polyester and foamed member made of polypropylene has been used, but it is possible to use cloth such as non-woven fabric and other woven fabric, synthetic leather, foamed member made of other thermoplasticity resin, thermoplasticity resin material, a single-layer material such as film printed with a pattern and so on, or a multilayer member lined with a lining material consisting of foamed member made of thermoplasticity resin and so on to an outer material made of vinyl chloride resin, thermoplasticity elastomer or the like, but in which the multilayer member differs from the aforementioned facing materials.

As a fastener means, not only the facing material 131 is fixed by the pins 128, but also the facing material 131 may be fixed by a vacuum suction means which has, for example, vacuum ports opened on the mold-faces 126, 127 and a vacuum pump causing the vacuum ports to be in a vacuumized state in order to suck and fix the facing material 131 through the vacuum ports.

Figure 7:
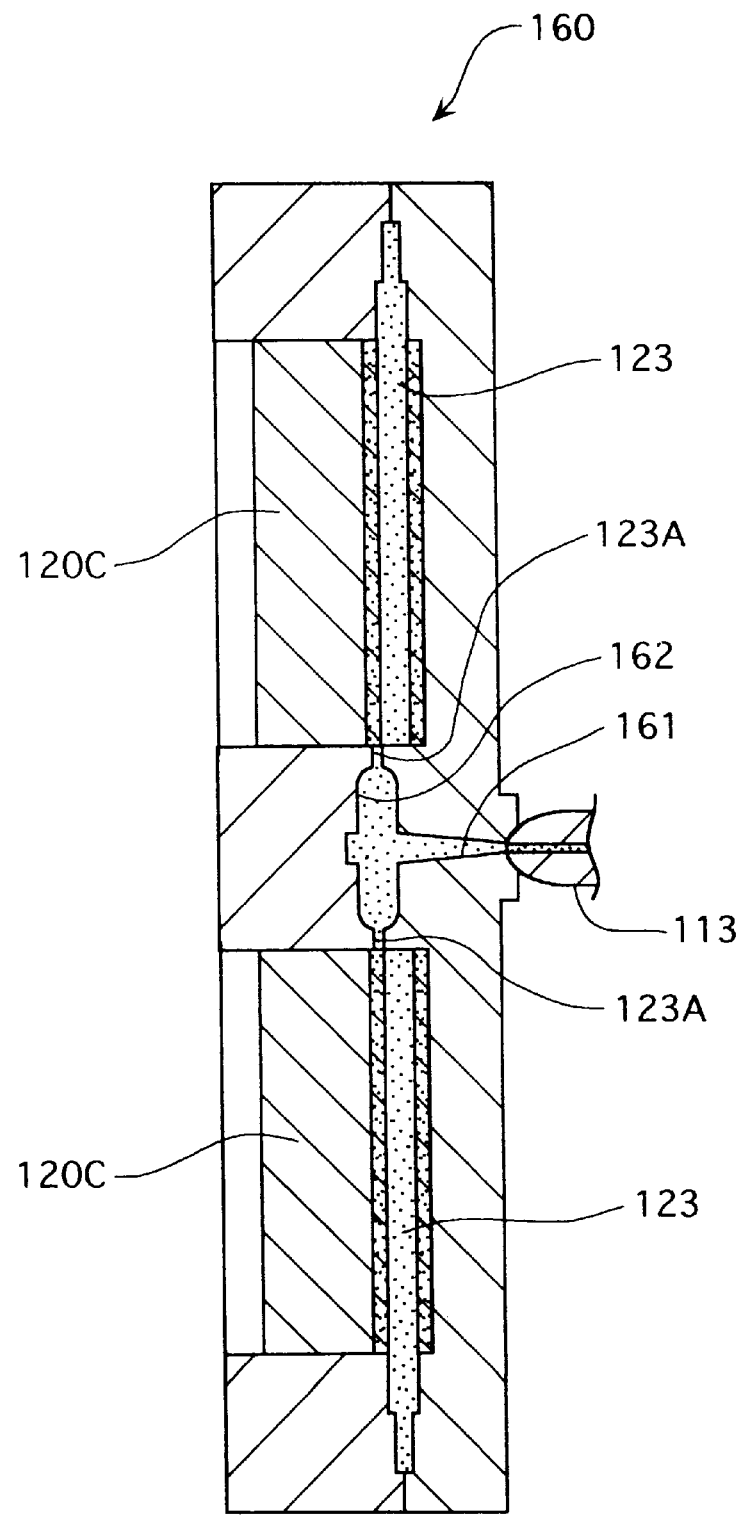
FIG. 7 is a sectional view of a modification according to the present invention.

Not only the mold including one cavity 123 but also a mold 160 including plural cavities 123 as shown in FIG. 7 may be used. When the aforementioned mold 160 is used, a runner 162 is provided in the mold 160 to connect to a downstream side of the sprue 161 and the end of the runner 162 is diverged to connect to each end side of the cavities 123, so that the synthetic resin 130 can be fed from one nozzle 113 through gates 123A to plural cavities 123 at the same time.

As for the wall portion of the mold, the wall portion 140 is not only capable of moving in a vertical direction within the apparatus to and from the mold-face 141, but the wall portion 140 may also be provided to fix on the mold-face 141 by projecting from the mold-face 141 to remove the chance of sinking in the inside of the mold-face 141.

It has been explained that the facing materials of the molding are attached to the both sides of the molding, but the facing material may be attached to only the one side of the molding.

Furthermore, the molding condition such as the set point of the compressive force and the starting time of each process is defined as not only the condition described in the aforementioned practical examples, but also the condition capable of selecting various values in response to the size of the molding, the type of resin or the like and of being suitably set at a concrete value desired in the execution.

THIRD EMBODIMENT

Figure 8:
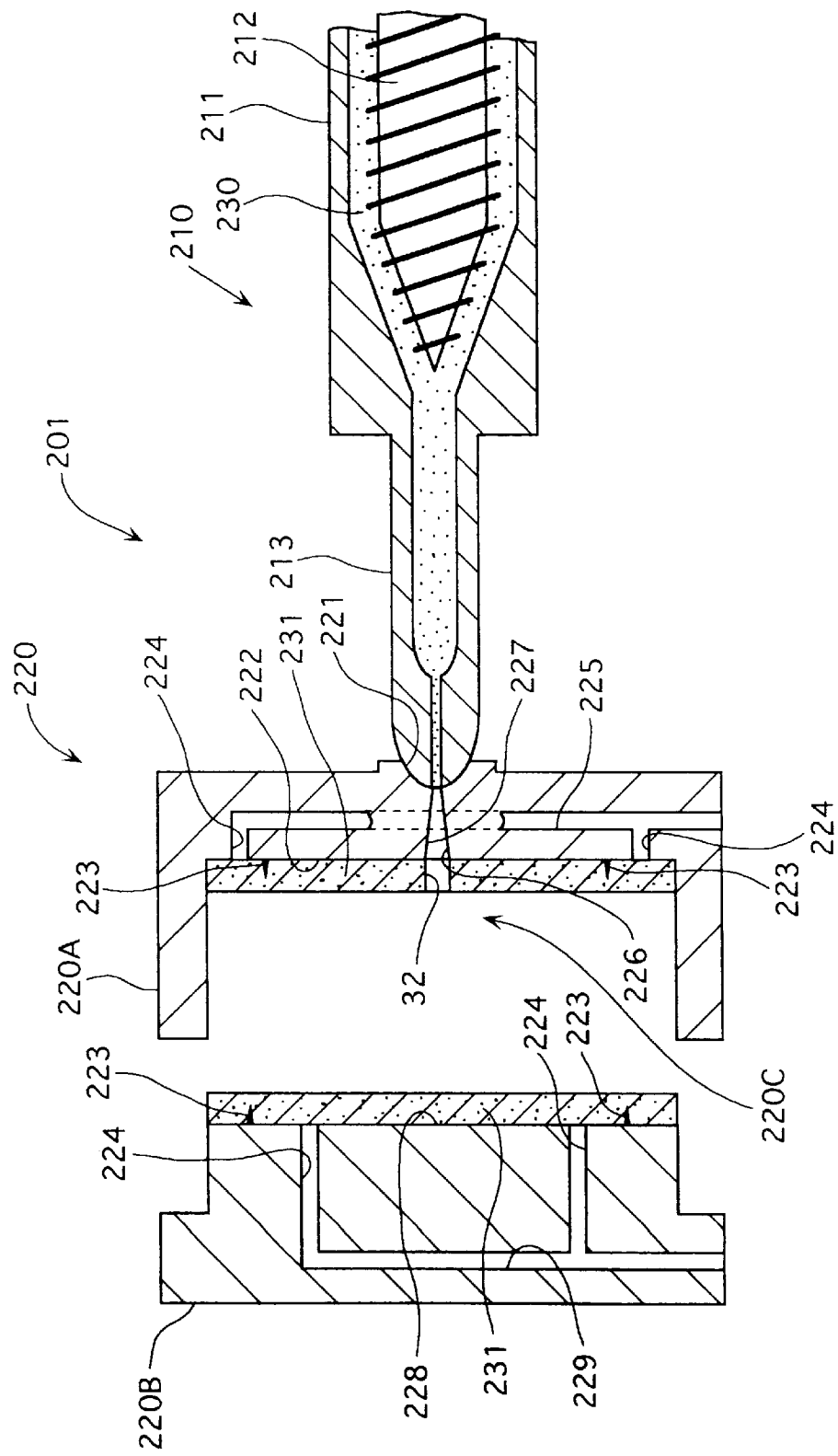
FIG. 8 is a fragmentary sectional view of an injection molding apparatus of a third embodiment according to the present invention.

FIG. 8 illustrates fragmentarily an injection compression molding apparatus 201 of a third embodiment according to the present invention, in which the injection compression molding apparatus 201 includes an injection device 210 injecting a melting synthetic resin 230 and a mold 220 for molding.

The injection device 210 consists of a screw 212 to squeeze kneadingly the melting synthetic resin 230 into a barrel 211. At the forward end of the barrel 211, a nozzle 213 is oriented. The nozzle 213 connects to a bush 221 of the mold 220 to inject the resin 230 into the mold 220, so that the melting synthetic resin 230 is adapted to be fed into the mold 220.

The mold 220 is split into a stationary mold portion 220A on the right side of the drawing and a movable mold portion 220B on the left side. A cavity 220C is provided between the stationary mold portion 220A and the movable mold portion 220B to mold in the melting synthetic resin 230 that is fed into the mold.

The stationary mold portion 220A is of a mold male half-member securely attached to the injection compression molding apparatus 201. An facing material 231, which is to be attached to one side of the molding, is prepared on a mold-face 222 of the stationary mold portion 220A by upstanding pins 223 projecting from the surface of the mold-face 222 and vacuum ports 224 opened on the mold-face 222.

The vacuum ports 224 are linked through a pressure guiding passage 225 tunneled in the stationary mold portion 220A with a vacuum pump (not-shown). The vacuum ports 224 are effected to be in a negative pressure state by the vacuum pump, so that the facing material 231 on the mold-face 222 clings to the vacuum ports 224. The vacuum ports 224 and the vacuum pump form a vacuum suction means in order to fasten the facing material 231 on the mold-face 222 during a molding process.

Furthermore, in the central area of the stationary mold portion 220A, a direct-gate 226 is opened in order to feed the melting synthetic resin 230. The direct-gate 226 is adapted to associate through a sprue 227 tunneled in the central area of the stationary mold portion 220A with the nozzle 213 of the injection device 210, in which the nozzle 213 connects to the bush 221 of the mold.

The movable mold portion 220B is of a movable mold female half-member with reference to the injection compression molding apparatus 201. The other facing material 231, which is to be attached to the other side of the molding, is prepared on a mold-face 228 of the movable mold portion 220B by the upstanding pins 223 projecting from the surface of the mold-face 228 and the vacuum ports 224 opened on the mold-face 228 like the case of the stationary mold portion 220A.

The vacuum ports 224 draws the facing material 231 up with negative pressure produced by the vacuum pump (not-shown) which is connected through a pressure guiding passage 229 tunneled in the movable mold portion 220B to the suctorial port 224.

A clamping device (not-shown) is provided at the left side of the movable mold portion 220B in the drawing. The clamping device causes the movable mold portion 220B to move toward the stationary mold portion 220A, until the mold 220 is closed and the melting synthetic resin 230 fed into the cavity 220C is to be compressible.

The clamping device causes a force compressing the movable mold portion 221B to be continuously adjusted within a range 0–100% of maximum pressure.

The facing material 231 is of a thick foaming sheet having cushioning properties. The facing material 231 prepared in the stationary mold portion 220A includes a through-hole 232 at a position corresponding to the direct-gate 226 on the mold-face 222. The melting synthetic resin 230 is adapted to be fed through the direct-gate 226 and the through-hole 232 to the cavity 220C into an area between the facing materials 231.

In this embodiment, the injection compression molding will be facilitated by the following process.

First, the mold 220 is opened to prepare the facing materials 231 on the mold-faces 222, 228 of the stationary mold portion 220A and the movable mold portion 220B respectively, while the mold 220 is closed.

Figure 9A:
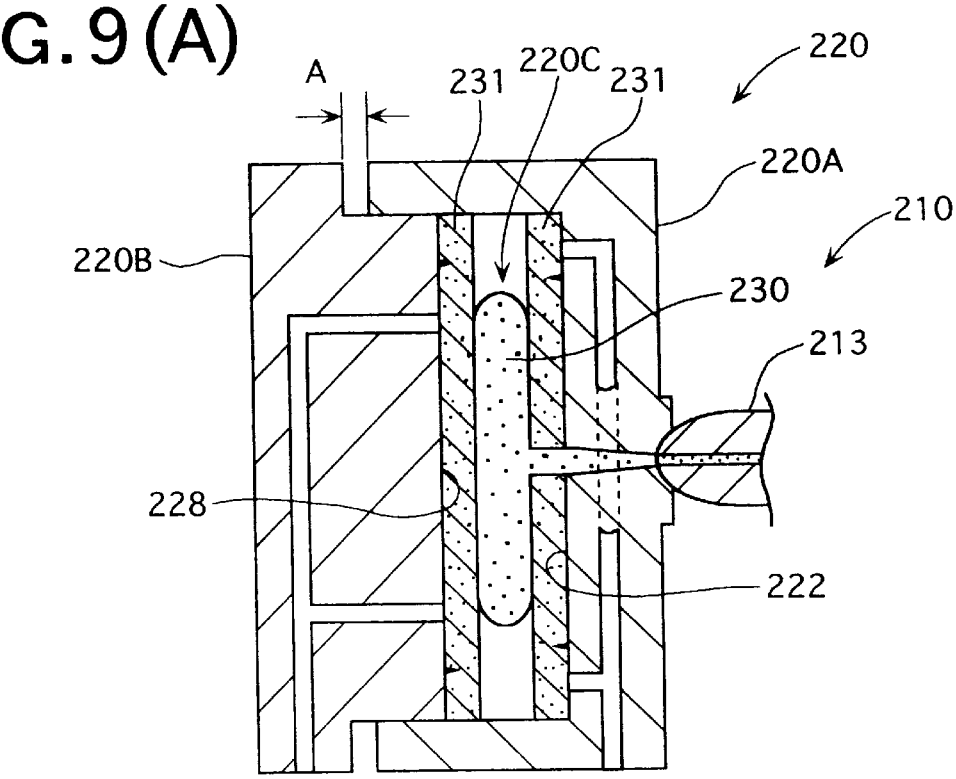
FIG. 9(A) and FIG. 9(B) are explicative diagrams of a molding process in the third embodiment.

As shown in FIG. 9(A), the movable mold portion 220B stops moving before its completely closed state with a predetermined interval A not to be reversed and not to be opened any more. In the aforementioned uncompleted closed state of the mold, the injection device 210 is driven to start a feed process to feed the melting synthetic resin 230 to the inner cavity 220C of the mold 220.

Figure 9B:
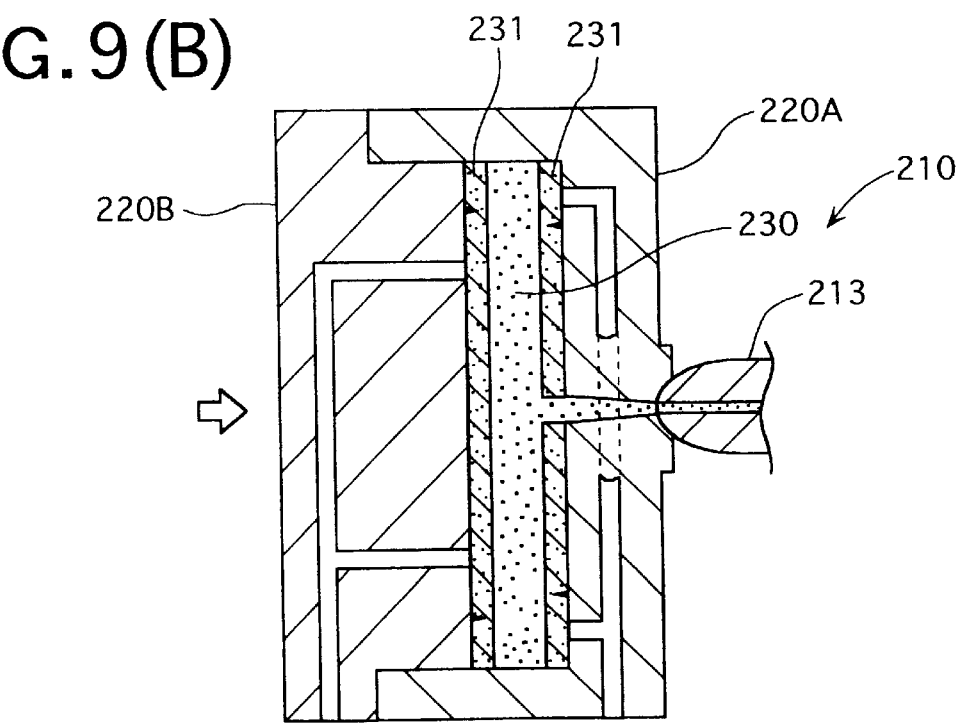

And, just before or after finishing the feed process, the clamping device is driven in order to start a compression process to add compressive force to the melting synthetic resin 230 fed to the inner cavity 220C by moving the movable mold portion 220B toward the stationary mold portion 220A as shown in FIG. 9(B).

Furthermore, in the compression process, three processes take place in the following order, these three processes are a filling process filling up the whole cavity 220 with the melting synthetic resin 230 with a spread, a protection process decreasing the compressive force added to the melting synthetic resin 230, and a pressure retainment process increasing the compressive force added to the melting synthetic resin 230.

More specifically, in the filling process, the melting synthetic resin 230 is spread in every corner of the cavity 220 by advancing the movable mold portion 220B. At the time the melting synthetic resin 230 has completely reached every corner of the cavity 220A, the filling process will finish.

No sooner has the filling process finished, than the protection process, which decreases the compressive force added to the melting synthetic resin 230, is started in order to protect the facing material 231 from damage caused by compression.

During the protection process, the surface of the melting synthetic resin 230 is cooled until a temperature that the facing material 231 does not suffer from is incorporated. After sufficiently cooling the surface of the melting synthetic resin 230, the protection process is finished and the pressure retainment process starts increasing the compressive force in order to cool and solidify the melting synthetic resin 230.

In the pressure retainment process, the melting synthetic resin 230 is cooled and solidified under enough of the compressive force to cause the melting synthetic resin 230 to maintain a predetermined shaped configuration. At the time the melting synthetic resin 230 is cooled and solidified sufficiently, the pressure retainment process finishes and the mold is opened to take out the produced molding. In completion of the injection process, a plasticization process for plasticizing a newly fed melting synthetic resin 230 will be naturally started for the next injection molding process.

According to the previously described process, each degree of the compressive force in the filling process, the protection process and the pressure retainment process is previously defined before carrying out the injection compression molding. Set points in each of the aforementioned processes are assigned as set points SP1, SP2 and SP3 which will be determined as the follows:

In particular, the set point SP1 in the filling process is defined at a high enough pressure value to be able to spread the melting synthetic resin 230.

The set point SP2 in the protection process is defined at a low enough pressure value to cause the facing material 231 to be protected from suffering damage caused by compression.

The set point SP3 in the pressure retainment process is defined at a relatively higher pressure value capable of causing the melting synthetic resin 230 to remain at the predetermined configuration shape, by compressing the melting synthetic resin 230 against both of the mold-faces 222, 228.

The comparative force of each of the set points SP1, SP2 and SP3 is SP1>SP3>SP2.

According to the embodiment, the following effects will be described.

The injection pressure is increased in the feed process in order to quickly feed with the melting synthetic resin 230, and further, in the filling process in the compression process, the larger compressive force is added to the melting synthetic resin 230 in order to quickly spread the melting synthetic resin 230, whereby it can take a shorter time to mold one molding in a cycle of the process.

And in the feed process feeding the melting synthetic resin 230, there is a space having a larger volume in the inside of the mold 220 than the volume of the molding. This is because the mold in an incompletely closed state. Therefore the melting synthetic resin 230 does not crush down the facing material 231 even if the melting synthetic resin 230 is fed in the higher injection pressure, whereby the facing material 231 can be prevented from suffering damage during the feed process.

Furthermore, the facing material 231 does not suffer damage due to crushing, even if the melting synthetic resin 230 is compressed in the filling process in which the melting synthetic resin 230 still remains in the spreadable state. Therefore, the large compressive force is adapted to add to the melting synthetic resin 230 in the filling process, however, the facing material 231 suffers from damage when the melting synthetic resin 230 is compressed in the protection process in which the melting synthetic resin 230 already loses the spreadable state. This means the compressive force added to the melting synthetic resin 230 needs to be decreased in the protection process. Therefore, the facing material 231 never suffers from damage in either of the filling process or the protection process. In short, the facing material 231 can be prevented from suffering any damage.

Consequently the facing material 231 keeps up its quality such as its cushioning properties and further, the injection compression molding can be facilitated in a shorter time in a cycle process.

In the pressure retainment process in which the cushioning properties of the facing material 231 are not likely to suffer damage from heat by the melting synthetic resin 230 because of the surface of the melting synthetic resin 230 cooled already, the melting synthetic resin 230 is cooled and solidified under the increased compressive force again, whereby the cushioning properties of the facing material 231 are not inferior and the time needed for cooling the melting synthetic resin 230 is shorter, briefly, the injection compression molding can be facilitated in a shorter time in a cycle process.

Since each facing material 231 is securely fixed on the mold-faces 222, 228 by the pins 223 projecting from the mold-faces 222, 228 and the suctorial ports 224 sending negative pressure, the facing material 231 dose not slide from the mold-faces when the melting synthetic resin 230 is fed or is compressed, and further, the molding can be easily taken out from the mold 220 when the mold is opened for removal because a different case from the facing material that is fixed by adhesive and so on is used compared with the conventional method.

FOURTH EMBODIMENT

Figure 10:
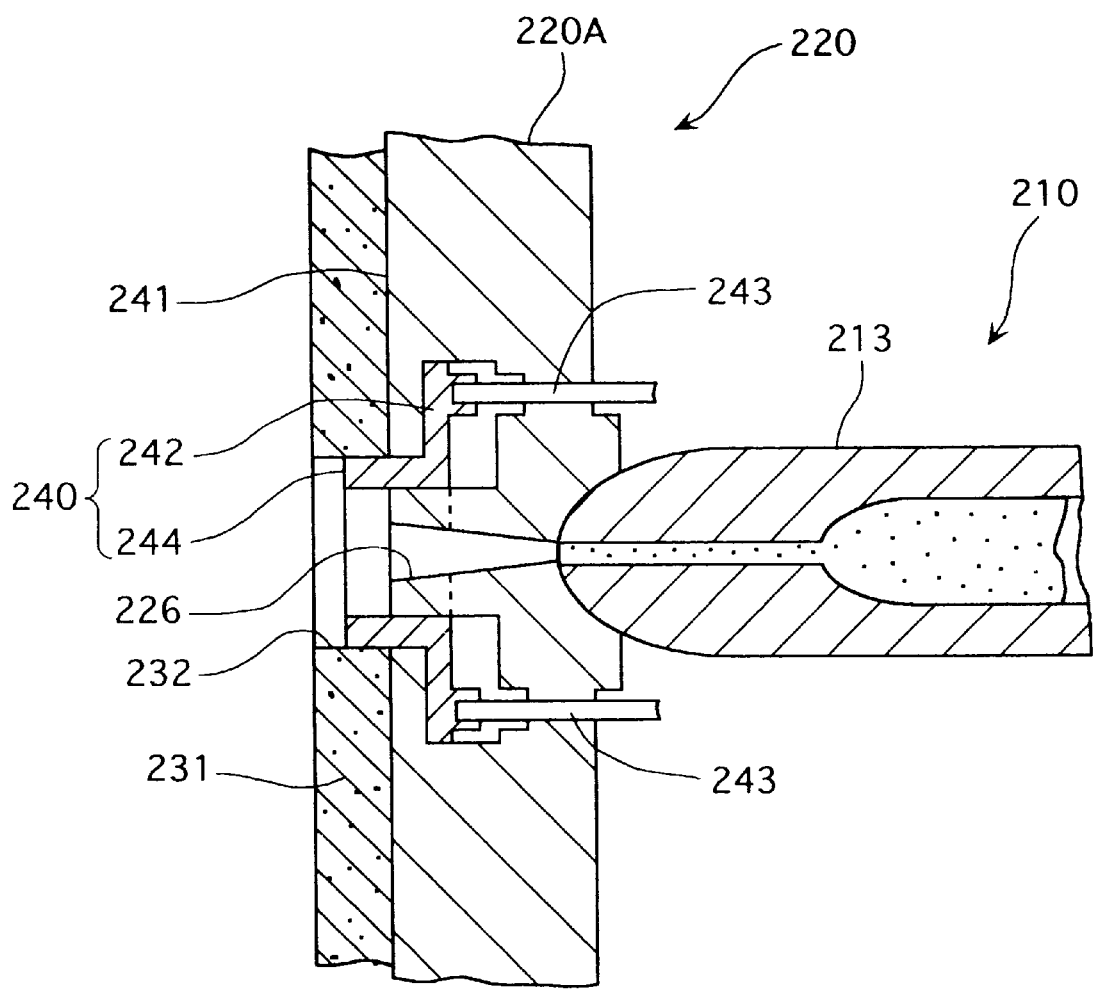
FIG. 10 is a fragmentary sectional view of a fourth embodiment according to the present invention.
Figure 11:
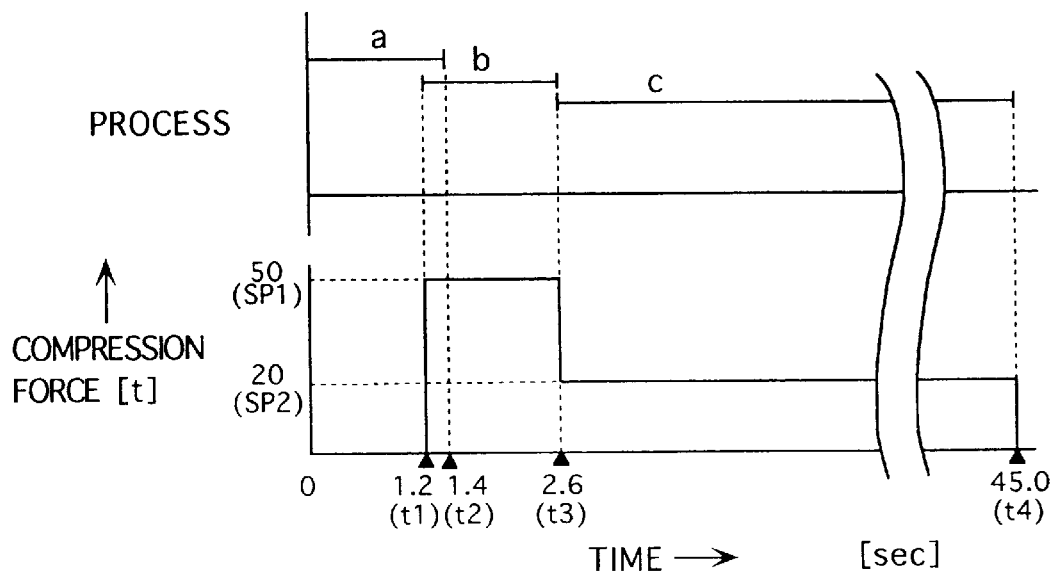
FIG. 11 is an explicative diagram of a molding process in practical example 3 according to the present invention.

FIG. 10 shows a fourth embodiment according to the present invention. In the embodiment, a mold-face 241 having a wall portion 240 projecting from the stationary mold portion 220A surrounding the direct-gate 226 replaces the flat mold-face 222 of the stationary mold portion 220A in the aforementioned third embodiment.

More specifically, the wall portion 240, which has a cylindrical shape including a collar portion 242 at its end in the mold 220A, is facilitated to move between the inside and the outside of the stationary mold portion 220A in a vertical direction to the apparatus. The collar portion 242 is fixed at the end of a rod 243 which transfers driving force delivered from the outside. The rod 243 is reciprocated in a vertical direction to the nozzle 213 by a driving device (not-shown) such as a hydraulic cylinder device, whereby an end portion 44 of the wall portion 40 is adapted to forcibly project on the mold-face 41.

When the facing material 231 is prepared in the mold 220, the end portion 244 of the wall portion 240 is projected from the mold-face 241 to enter in the through-hole 232 of the facing material 231. At the time the filling process finishes or is just about to, the end portion 244 sinks in the stationary mold portion 220A, so that the side face of the end portion 244 is then flush with the surface of the mold-face 241.

The embodiment can obtain the effects and the action similar to the third embodiment, and in addition, a fine appearance of the molding can be produced, namely, the melting synthetic resin 230 fed in the mold is not crowded out of the through-hole 232 of the facing material 231. This is because the end portion 244 of the wall portion 240 surrounds the outside of the through-hole 232 of the facing material 31 (in the right side of the drawing) in the feed process.

On the other hand, at the time or just before the filling process finishes, the end portion 244 of the wall portion 240 sinks in the stationary mold portion 220A. Therefore, the molding does not have thereon deformation caused by the wall portion 240 surrounding the direct-gate 226. Thus, the embodiment can add another effect in which the uniform thickness of the melting synthetic resin 230 causes the strength of the molding to be prevented from decreasing by a thin part produced with deformation and so on.

PRACTICAL EXAMPLE 3

Now, the effects of the present invention will be explained in accordance with concrete practical examples.

The practical example 3 is of an experiment with molding the laminated molding in accordance with the aforementioned first embodiment.

In the practical example 3, the feed process a, the filling process b and the protection process c are performed in order as shown in FIG. 4. The melting synthetic resin 230 undergoes retainment of pressure in the protection process c of all processes, and the independent pressure retainment process is omitted.

Following are timings of starting and completing each of the processes a–c and the set points of the compressive force and so on through each of the processes b, c.

Incidentally, a starting time t0 of the feed process a is defined as a standard time (t0=0 sec.), timings of starting and completing each of the processes a–c are indicated as a passage of time (sec.) passing from the start of the feed process a.

| | |
|---|---|
| Starting time t1 of the filling process b | 1.2 sec. |
| Completing time t2 of the feed process a | 1.4 sec. |
| Starting time t3 of the protection process c (Completing time of the filling process b) | 2.6 sec. |
| Completing time t4 of the protection process c | 45.0 sec. |
| Set point SP1 of the compressive force in the filling process b | 50 ton |
| Set point SP2 of the compressive force in the protection process c | 20 ton |

PRACTICAL EXAMPLE 4

Figure 12:
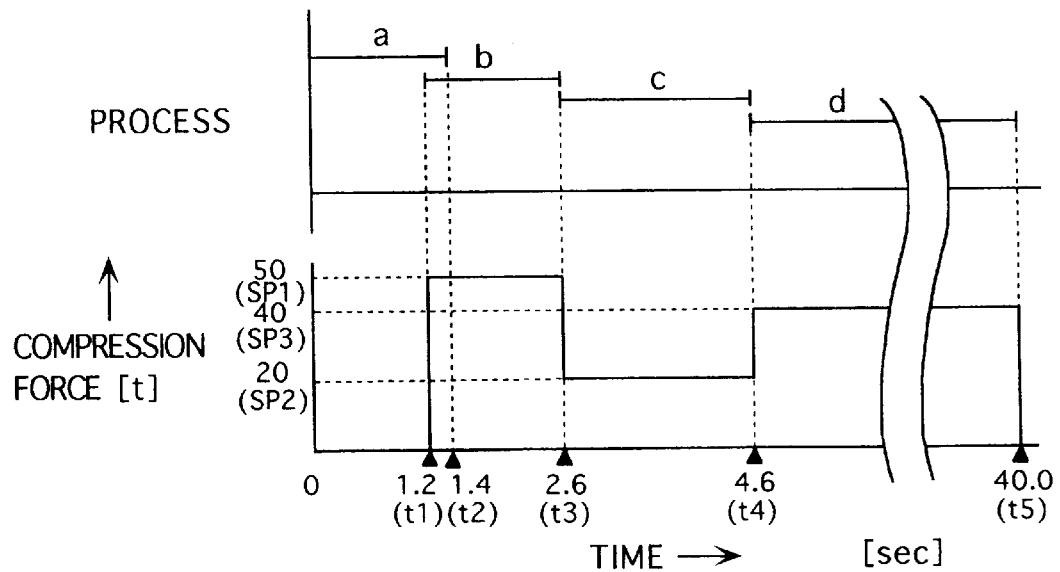
FIG. 12 is an explicative diagram of a molding process in practical example 4 according to the present invention.

The practical example 4 is of an experiment with molding the laminated molding by adding the pressure retainment process d to the aforementioned practical example 3. In the practical example 4, the feed process a, the filling process b, the protection process c and the pressure retainment process d are performed in order as shown in FIG. 12.

Following are timings of starting and completing each of the processes a–d and the set points of the compressive force and so on through each of the processes b–d.

| | |
|---|---|
| Starting time t1 of the filling process b | 1.2 sec. |
| Completing time t2 of the feed process a | 1.4 sec. |
| Starting time t3 of the protection process c (Completing time of the filling process b) | 2.6 sec. |
| Completing time t4 of the protection process c (Starting time of the pressure retainment process d) | 4.6 sec. |
| Completing time t5 of the pressure retainment process d | 40.0 sec. |
| Set point SP1 of the compressive force in the filling process b | 50 ton |
| Set point SP2 of the compressive force in the protection process c | 20 ton |
| Set point SP3 of the compressive force in the pressure retainment process d | 40 ton |

COMMON INJECTION CONDITION

Both of the practical examples 3 and 4 are performed with the following materials, apparatus, molding condition and so on to mold the molding.

(1) MATERIALS

As synthetic resin consisting of the molding, polypropylene: MI 55 g/10 min., 230° C., 2.16 kgf (a brand name: IDEMITSU Polypro J-5050H by IDEMITSU PETROCHEMICAL CO., LTD.) is employed.

In the practical example 3, the facing material is made by using non-woven fabric having the thickness of 2.0 mm and made of polyester. On the other hand, in the practical example 4, the facing material is made by using a laminated sheet material having the thickness of 3.6 mm, in which the laminated sheet material is unitedly composed of an outer layer having the thickness of 0.6 mm and made of vinyl chloride resin and a foamed member having the thickness of 3.0 mm and made of polypropylene.

(2) MOLDING APPARATUS

Regarding the molding apparatus, an apparatus being of a general horizontal injection molding apparatus (the maximum clamping force: 200 ton, by TOSHIBA MACHINE CO., LTD.) including an injection compression molding system is used.

(3) MOLD

The mold is designed to have a disk-shaped cavity having a diameter of 250 mm and a direct-gate provided at the center of the cavity. The separating portion of the mold is adapted to be the inrow system, namely, the movable mold portion moves to fit into the stationary mold portion.

(4) MOLDING CONDITION

| ① | Molding temperature | 200° C. |
|---|---|---|
| ② | Mold temperature | 40° C. |
| ③ | Injection pressure of resin | 90 kg/cm² (gauge pressure) |
| ④ | Compressive degree of the movable mold portion | 10 mm |
| ⑤ | Moving speed of the movable mold portion | 10 mm/sec. |

COMPARATIVE EXAMPLE 2

In order to ascertain the effects of the present invention, the comparative example 2 is conducted to obtain the same molding as the aforementioned practical example 3 with an injection molding method of the conventional art.

The comparative example 2 is performed with the same materials and devices as the practical example 3, but in the comparative example, the melting synthetic resin 230 is fed into the mold 220 at a higher injection pressure than the practical example 3.

Concretely, the molding is molded by the following steps, first, the melting synthetic resin 230 is fed for 2.0 seconds at the injection pressure from the injection device defined as 100 kg/cm², and the melting synthetic resin 230 is further fed for 5.3 seconds at the injection pressure increased to 200 kg/cm². Then, finally the melting synthetic resin 230 is retained to receive pressure for 5.0 seconds at the retained pressure defined as 400 kg/cm².

RESULT OF EXPERIMENTS (1) The molding obtained in the practical example 3 results in that the facing material 231 does not suffer very much damage and the thickness of the facing material 231 becomes 1.8 mm slightly reduced by 0.2 mm. There are no disadvantages on the facing material 231, for example, standing fibril on the facing material is squashed horizontally or the edge of the facing material is folded back.

Considering the reason stated thus far, according to the practical example 1, it is understood that fine molding 253 can be obtained.

(2) The molding obtained in the practical example 4 results in that the thickness of the facing material 231 becomes 2.6 mm slightly reduced by 0.1 mm. Although the completing time of the mold is five seconds earlier than the practical example 3, the facing material 231 can retain its cushioning properties sufficiently, and further there are no disadvantages such as pits and ugly grain on the facing material 231.

From the reason stated above, according to the practical example 4, it is understood that the fine molding 253 can be obtained, and besides, the time it takes to mold in the cycle processes can be shorter.

(3) The molding obtained in the comparative example 2 results in the thickness of the facing material 231 having a remarkable decrease, as it becomes 1.1 mm reduced by 0.9 mm, almost half thickness, and further disadvantages are produced, for instance, standing fibril on the facing material 231 is squashed horizontally.

Consequently, the appearance of the facing material 231 is inferior due to the above disadvantages, so that it is understood that the fine molding 253 is not obtained in the comparative example 2.

Although the present invention has been disclosed in detail by referring to particular preferred practical examples and the comparative example, it is to be understood that the present invention is not intended to be limited to the aforementioned practical examples and the comparative example. Further, various changes and modifications on design may be made therein without departing from the spirit of the present invention.

For example, as synthetic resin consisting of the molding, not only polypropylene but also thermoplasticity resin such as polyethylene, polystyrene, ABS, polycarbonate, or resin resulted from adding filler such as talc, calcium carbonate, mica and glass fiber to such thermoplasticity resin may be used.

As the facing material, the laminated sheet composed of an outer layer made of vinyl chloride resin or non-woven fabric of polyester and foamed member made of polypropylene has been used. It is also possible to use cloth such as non-woven fabric and other woven fabric, foamed member made of other thermoplasticity resin, thermoplasticity resin material, a single-layer material such as film printed with pattern and so on. Also a multilayer member lined with a lining material consisting of foamed member made of thermoplasticity resin and so on to an outer material made of vinyl chloride resin, thermoplasticity elastomer or the like, but in which the multilayer member differs from the aforementioned facing materials.

As a fastener means, both ways of the pin 223 fixing the facing material 231 and the suctorial port 224 vacuuming the facing material 231 have been used, but only one way of both of the pin 223 and the suctorial port 224 may be used.

Figure 13:
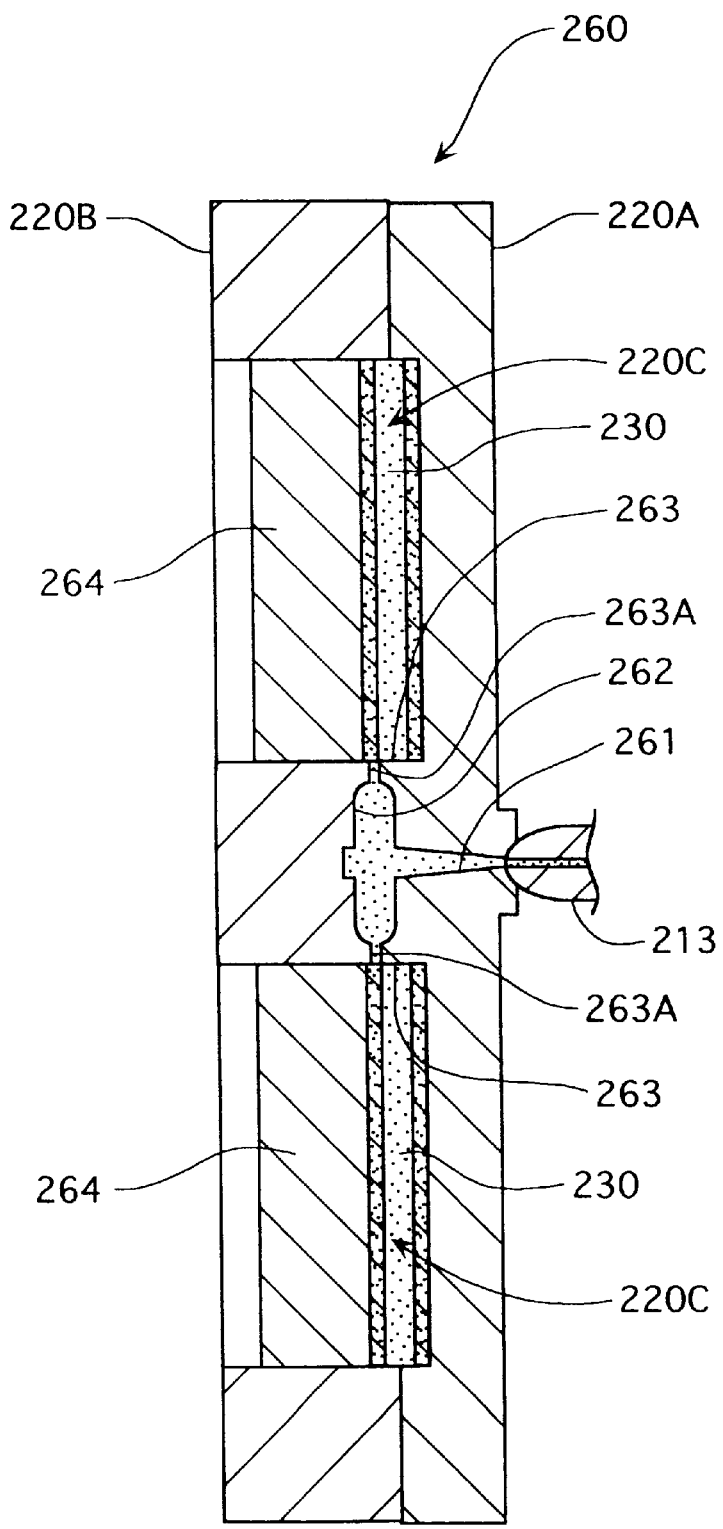
FIG. 13 is a sectional view of the other modification according to the present invention.

Not only the mold including one cavity 220C but also a mold 260 including plural cavities 220C as shown in FIG. 13 may be employed. When the aforementioned mold 260 is used, a runner 262 is provided to connect to a downstream side of the sprue 261 in the mold 260 and each end of the runner 262 connects to each end side 263 of the cavities or the like, so that the synthetic resin 230 can be fed from one nozzle 213 through gates 263A to plural cavities 220C at the same time.

Furthermore, when the mold 260 having plural cavities 220C is used, the melting synthetic resin 230 not only is compressed by moving the movable mold portion 220B toward the stationary mold portion 220A, but the melting synthetic resin 30 also may be compressed with a compression core 264 provided in the movable mold portion 220B to be capable of moving toward and away from each cavity 220C.

As for the wall portion of the mold, the wall portion 240 is not only capable of moving in a vertical direction to the apparatus, both to and from the mold-face 241, but the wall portion may also be provided to fix on the mold-face in a state of projecting from the mold-face and to be able not to sink in the inside of the mold-face.

Furthermore, the molding condition such as the set point of the compressive force and the starting time of each process is defined as not only the condition described in the aforementioned practical examples, but also the condition capable of selecting various values in response to the size of the molding, the type of resin or the like and of being suitably set at a concrete value desired in execution.

FIFTH EMBODIMENT

Figure 14:
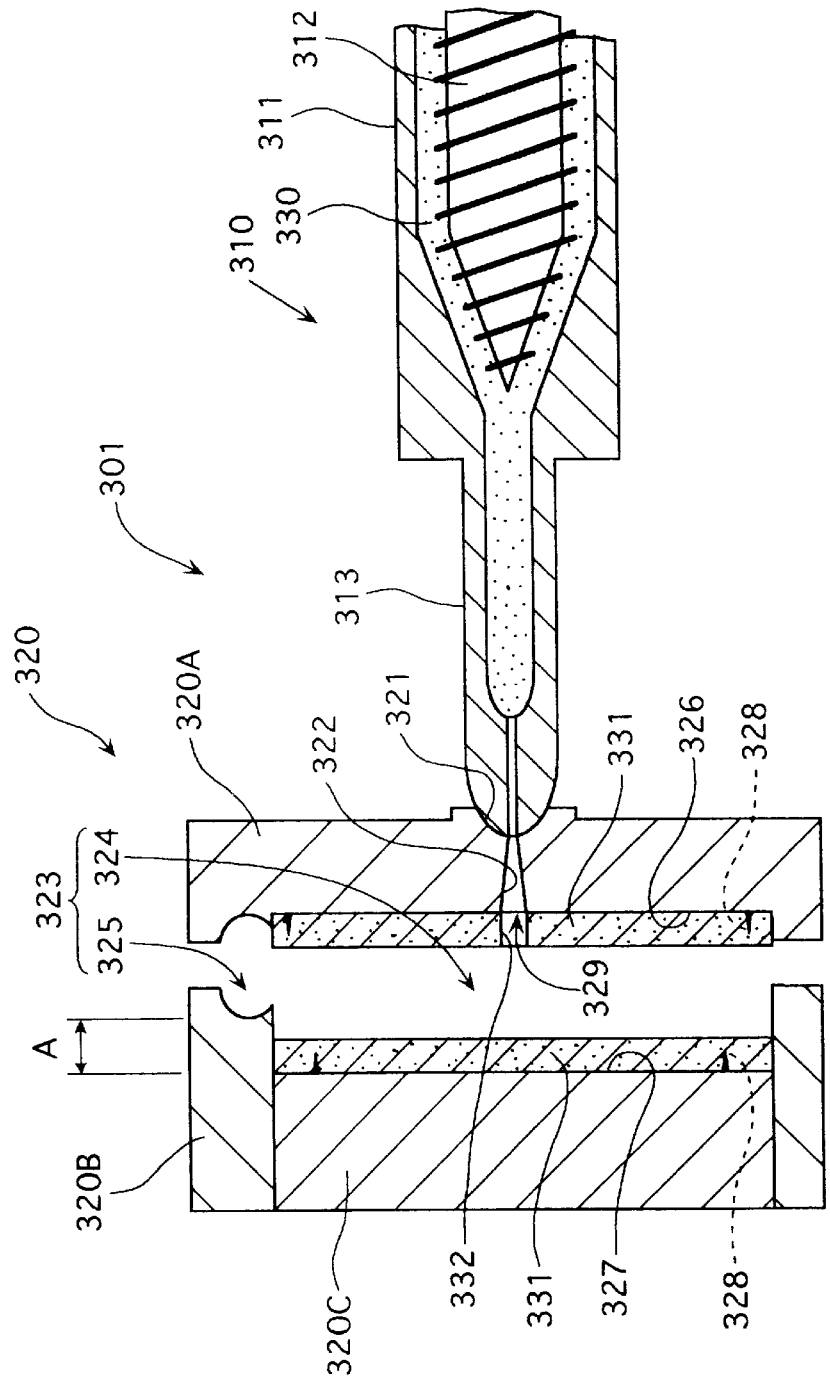
FIG. 14 a fragmentary sectional view of an injection molding apparatus of a fifth embodiment according to the present invention.

FIG. 14 illustrates fragmentarily an injection compression molding apparatus 301 of a fifth embodiment according to the present invention, in which the injection compression molding apparatus 301 includes an injection device 310 injecting a melting synthetic resin 330 and a mold 320 for molding.

The injection device 310 consists of a screw 312 to squeeze kneadingly the melting synthetic resin 30 into a barrel 311. At the forward end of the barrel 311, a nozzle 313 is a provided. The nozzle 313 connects to a bush 321 of the mold 320 to inject the resin 330 into the mold 320, so that the melting synthetic resin 330 is adapted to be fed into the mold 320.

The mold 320 is comprised of a stationary mold portion 320A on the right side of the drawing, a movable mold portion 320B on the left side, and a compression core 320C oriented to be capable of moving forward and backward in the movable mold portion 320B.

The stationary mold portion 320A is fixed in the injection compression molding apparatus 301 to render it immovable. In the stationary mold portion 320A, a sprue 322 leading the resin 330 into the mold 320 to pass through the central area of the stationary mold portion 320A as well as the bush 321 is provided.

The movable mold portion 320B is movably oriented in the injection compression molding apparatus 301.

In the left side of the movable mold portion 320B in the drawing, there is a clamping device provided (not-shown). The clamping device urges the movable mold portion 320B to move toward the stationary mold portion 320A, with the result that the mold 320 is closed.

The compression core 320C compresses the melting synthetic resin 330 fed into the mold 320. In the left side of the compression core 320C of the drawing, there is provided a non-shown compressing device.

The compressing device urges the compression core 320C to move toward or away from the stationary mold portion 320A, which the compress force is facilitated to be able to adjust continuously within a range 0–100% of the maximum extrusive pressure.

Furthermore, the stationary mold portion 320A, the movable mold portion 320B and the compression core 320C form a cavity 323 including an adhesion portion 324 on which a cushion surface-member 331 is to be placed. However, a non-adhesion portion 325 on which the cushion surface-member 331 lies is not to be placed.

The adhesion portion 324 is assigned on mutually facing mold-faces 326, 327 of the stationary mold portion 320A and the compression core 320C. The adhesion portion 324 is provided thereon with plural pins 328 as a fastener means fastening the cushion surface-member 331. Those pins 328 are projected from the mold-faces 326, 327 and stab into the cushion surface-members 331 so as to fasten the cushion surface-members 331 on the stationary mold portion 320A and compression core 320C.

The non-adhesion portion 325 is assigned up the adhesion portion 324 in the drawing to have a space shaped into cylindrical by surrounding it with mutually facing mold-faces of the stationary mold portion 320A and the movable mold portion 320B in order to form a rotation shaft portion of an air current control valve.

The cushion surface-member 331 to be fastened on the stationary mold portion 320A has a through-hole 332 at a position corresponding to a direct-gate 329. This direct-gate 329 is used as an exit of the sprue 322 which is opened at the central area of the mold-face 326. The melting synthetic resin 330 is fed through the direct-gate 329 and the through-hole 332 into the cavity 323.

In this embodiment, the injection compression molding will be facilitated with the following process.

First, the mold 320 is opened to prepare the cushion surface-members 331 on the mold-faces 326, 327 of the stationary mold portion 320A and the compression core 320C respectively, and the mold 320 is closed.

At this moment, the compression core 320C still remains at a rear position to secure a compression margin A as a distance capable of moving the compression core 320C in a compression process (see FIG. 14).

And, the injection device 310 is driven to start a feed process to feed the melting synthetic resin 330 to the inside of the cavity 323 of the mold 320 as shown in FIG. 15(A).

And, just before or after finishing the feed process, the clamping device is driven to start a compression process to add compressive force to the melting synthetic resin 330 fed to the inner cavity 323 by moving the compression core 320C for the compression margin A as shown in FIG. 15(B).

Furthermore, in the compression process, three processes take place in order. These three processes are a filling process filling up the whole cavity 323 with the melting synthetic resin 330 with a spread, a protection process decreasing the compressive force added to the cushion surface-member 331, and a pressure retainment process increasing the compressive force added to the melting synthetic resin 330.

More specifically, in the filling process, the melting synthetic resin 330 is spread in every corner of the cavity 323 by advancing the compression core 320C. At the time the melting synthetic resin 330 has completely reached every corner of the cavity 323, the filling process is to finish.

No sooner is the filling process finished than the protection process, which decreases the compressive force adding to the cushion surface-member 331, is started in order to protect the cushion surface-member 331 from damage caused by compression.

During the protection process, the surface of the melting synthetic resin 330 is cooled until the temperature of the cushion surface-member 331 remarkably does not suffer from being melt. After sufficiently cooling the surface of the melting synthetic resin 330, the protection process is finished and the pressure retainment process starts increasing the compressive force in order to cool and solidify the melting synthetic resin 330.

In the pressure retainment process, the melting synthetic resin 330 is cooled and solidified under sufficient compressive force to cause the melting synthetic resin 330 to maintain a predetermined shaped configuration. At that time the melting synthetic resin 330 is cooled and solidified sufficiently, the pressure retainment process finishes and the mold 320 is opened to take out the produced molding. In completion of the injection process, a plasticization process for plasticizing a newly fed melting synthetic resin 330 will be naturally started for the next injection molding.

According to the previously described system, each degree of the compressive force in the filling process, the protection process and the pressure retainment process is previously defined before carrying out the injection compression molding. Set points in the aforementioned processes are respectively assigned as set points SP1, SP2 and SP3 which will be determined as follows:

In particular, the set point SP1 in the filling process is defined at a sufficiently high pressure value to be able to spread the melting synthetic resin 330.

The set point SP2 in the protection process is defined at a sufficiently low pressure value to cause the cushion surface-member 331 to be protected from suffering damage caused by compression.

The set point SP3 in the pressure retainment process is defined at the relative higher pressure value capable of causing the melting synthetic resin 330 to remain at the predetermined configuration shape, by compressing the melting synthetic resin 330 against both sides of the mold-faces 326, 327.

The comparative force of each of the set points SP1, SP2 and SP3 is SP1>SP3>SP2.

According to the embodiment, the following effects will be described.

The injection pressure is increased in the feed process in order to feed the melting synthetic resin 330 quickly, and further, in the filling process in the compression process, the larger compressive force is added to the melting synthetic resin 330 in order to spread the melting synthetic resin 330 quickly, whereby it can take a shorter time to mold one molding in a cycle of the process.

Furthermore, since the mold 320 has a space inside with a larger volume than the molding when the compression core 320C being to be advanced in the compression process still remains at the initial position in the feed process which the melting synthetic resin 330 is fed, the melting synthetic resin 330 does not crush down the cushion surface-member 331 even if the melting synthetic resin 330 is fed into the mold 320 under a higher injection pressure, whereby the cushion surface-member 331 can be prevented from suffering damage during the feed process.

Again, the cushion surface-member 331 does not suffer being crushed even if the melting synthetic resin 330 is compressed in the filling process in which the melting synthetic resin 330 still remains in the spreadable state. The large compressive force is adapted to add to the melting synthetic resin 330 in the filling process, however, the cushion surface-member 331 suffers from crushing when the melting synthetic resin 330 is compressed in the protection process in which the melting synthetic resin 330 already loses the spreadable state, so that the compressive force added to the melting synthetic resin 330 is to be decreased in the protection process. Therefore, the cushion surface-member 331 never suffers the crushed damage in either the filling process or the protection process. Consequently the facing material 331 can be prevented from suffering severe damage.

Consequently the facing material 331 maintains its cushioning properties and further the injection compression molding can be facilitated in a shorter time in a cycle process.

The pressure retainment process, in which the cushioning properties of the cushion surface-member 331 do not suffer apprehensible damage heat by the melting synthetic resin 330 because of the surface of the melting synthetic resin 330 already cooled, facilitates to cool and solidify the melting synthetic resin 330 under the increased compressive force again, therefore, the cushioning properties of the cushion surface-member 331 are not inferior and the time for cooling the melting synthetic resin 330 is shorter, with the result that the injection compression molding can facilitate all its processes in a shorter time.

PRACTICAL EXAMPLE 5

The effects of the present invention will be explained in accordance with concrete practical examples.

The practical example 5 is of an experiment with molding the air current control valve in accordance with the present invention.

Figure 16:
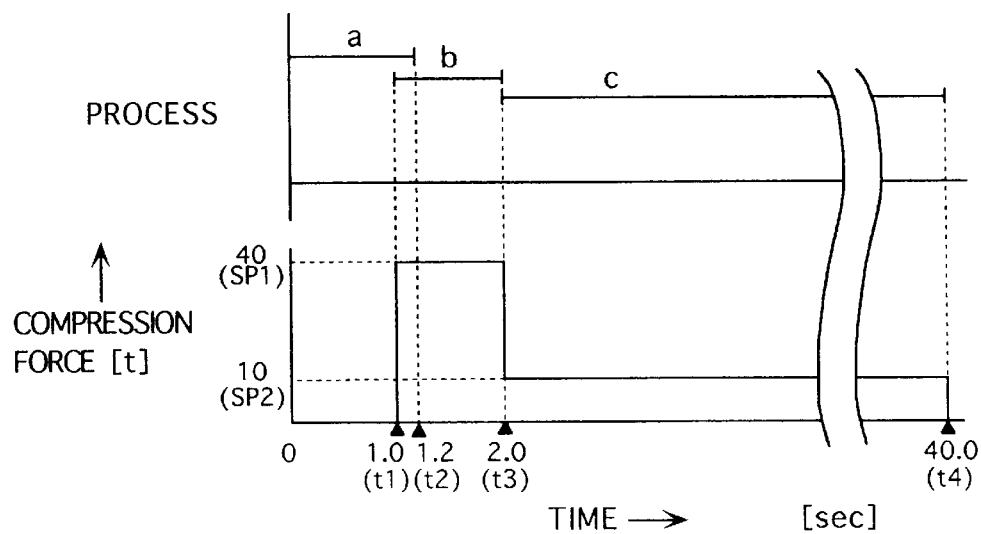
FIG. 16 is an explicative diagram of a molding process in practical example 5 according to the present invention.

In the practical example 5, the feed process a, the filling process b and the protection process c are performed in order as shown in FIG. 16. The melting synthetic resin 330 undergoes retainment of pressure in the protection process c of all processes, and the independent pressure retainment process is omitted.

Following are timings of starting and completing each of the processes a–c and the set points of the compressive force and so on through each of the processes b, c.

Incidentally, a starting time t0 of the feed process a is defined as a standard time (t0=0 sec.), timings of starting and completing each of the processes a–c are indicated as a passing time (sec.) passing from the start of the feed process a.

| | |
|---|---|
| Starting time t1 of the filling process b | 1.0 sec. |
| Completing time t2 of the feed process a | 1.2 sec. |
| Starting time t3 of the protection process c (Completing time of the filling process b) | 2.0 sec. |
| Completing time t4 of the protection process c | 40.0 sec. |
| Set point SP1 of the compressive force in the filling process b | 40 ton |
| Set point SP2 of the compressive force in the protection process c | 10 ton |

PRACTICAL EXAMPLE 6

Figure 17:
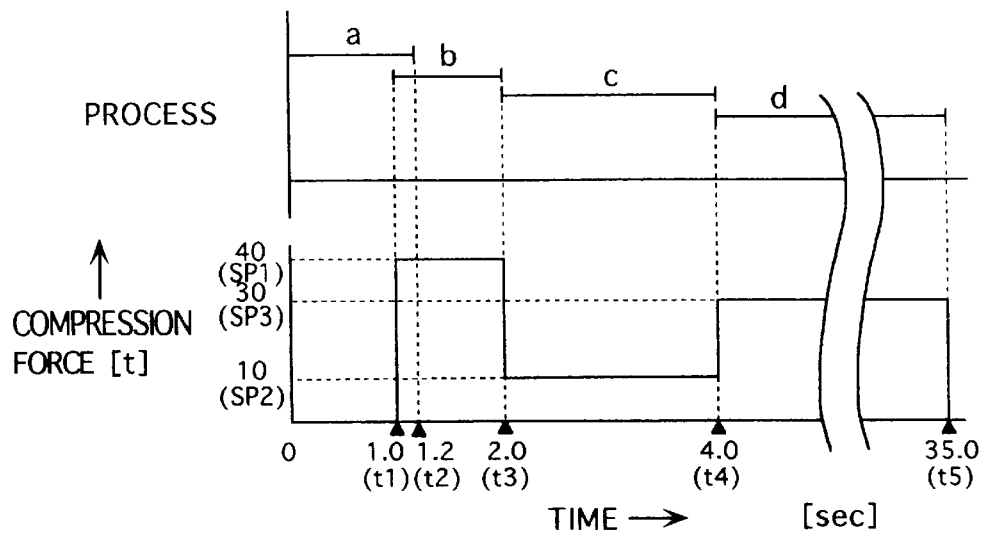
FIG. 17 is an explicative diagram of a molding process in practical example 6 according to the present invention.

The practical example 6 is of an experiment with molding the air current control valve by adding the pressure retainment process d to the aforementioned practical example 5. In the practical example 6, the feed process a, the filling process b, the protection process c and the pressure retainment process d are performed in order as shown in FIG. 17.

Following are timings of starting and completing each of the processes a–d and the set points of the compressive force and so on through each of the processes b–d.

| | |
|---|---|
| Starting time t1 of the filling process b | 1.0 sec. |
| Completing time t2 of the feed process a | 1.2 sec. |
| Starting time t3 of the protection process c (Completing time of the filling process b) | 2.0 sec. |
| Completing time t4 of the protection process c (Starting time of the pressure retainment process d) | 4.0 sec. |
| Completing time t5 of the pressure retainment process d | 35.0 sec. |
| Set point SP1 of the compressive force in the filling process b | 40 ton |
| Set point SP2 of the compressive force in the protection process c | 10 ton |
| Set point SP3 of the compressive force in the pressure retainment process d | 30 ton |

COMMON INJECTION CONDITION

Both of the practical examples 5 and 6 are performed with the following materials, apparatus, molding condition and so on to mold the molding.

(1) MATERIALS

As for synthetic resin consisting of the valve body, polypropylene: MI 55 g/10 min., 230° C., 2.16 kgf (a brand name: IDEMITSU Polypro J-5050H by IDEMITSU PETROCHEMICAL CO., LTD.) containing talc of 30 Wt % is employed.

As for the cushion surface-member, polyurethane foamed to 30 times the volume and having a thickness of 5.0 mm is used.

(2) MOLDING APPARATUS

As for the molding apparatus, an apparatus accompanying a movable die-plate of a general horizontal injection molding apparatus (the maximum clamping force: 200 ton, by TOSHIBA MACHINE CO., LTD.) with the compression device of a hydraulic driving type is used.

(3) MOLD

Figure 18:
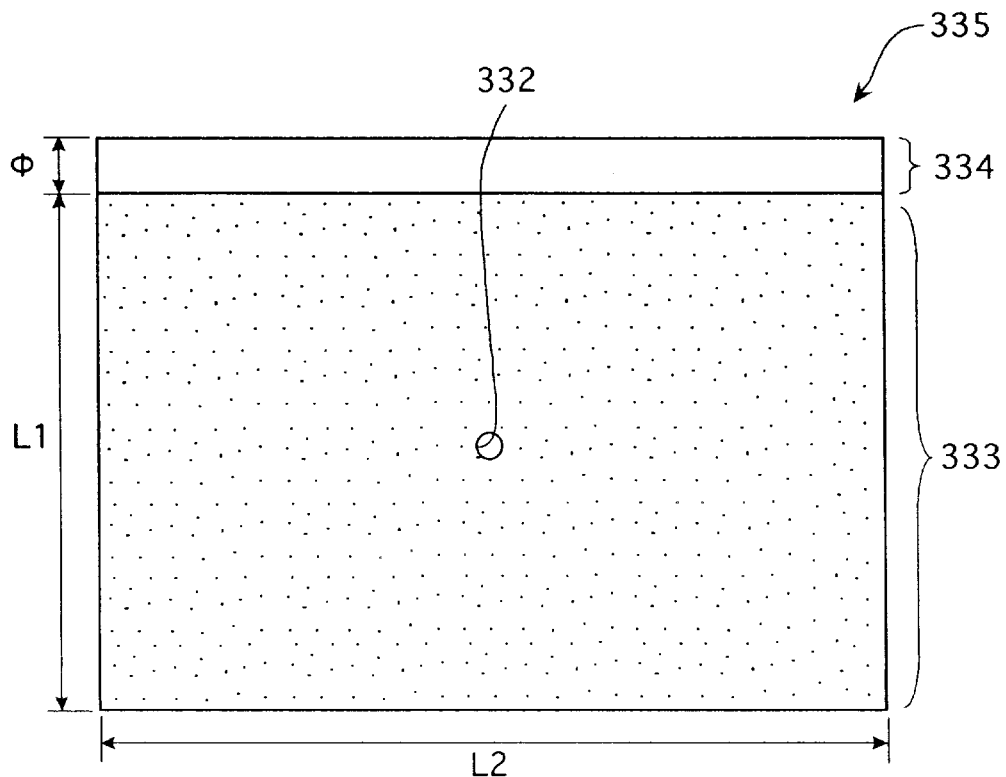
FIG. 18 is a front view of an air current control valve molded in practical examples 5, 6.
Figure 19:
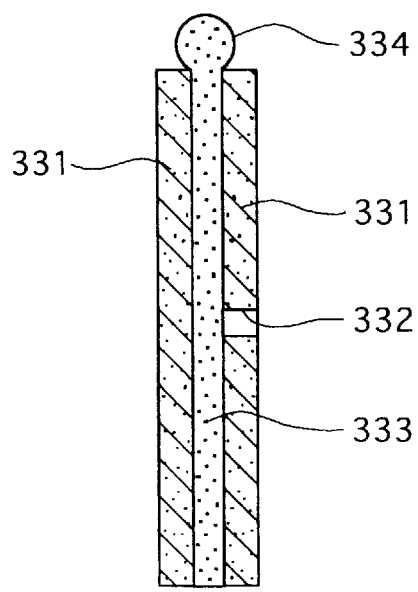
FIG. 19 is a sectional view of the air current control valve molded in practical examples 5, 6.

With regard to the mold, the used mold 320 is designed to include the cavity 323 in order to form the molding (the air current control valve) 335 having the rotation shaft portion 334 which is up the valve body 333 shaped into a quadrangle in the drawings as shown in FIG. 18 and FIG. 19.

A length measurement L1 and a lateral measurement L2 of the valve body 333 are respectively defined as 100 mm and 200 mm, and a diameter ø of the rotation shaft portion 334 is defined as 14 mm.

(4) MOLDING CONDITION

| | | |
|---|---|---|
| ① | Molding temperature | 200° C. |
| ② | Mold temperature | 40° C. |
| ③ | Injection pressure of resin | 80 kg/cm² (gauge pressure) |
| ④ | Compressive degree of the compression core | 30 mm |
| ⑤ | Moving speed of the compression core | 10 mm/sec. |

COMPARATIVE EXAMPLE 3

In order to ascertain the effects of the present invention, the comparative example 3 is conducted to obtain the same molding as the aforementioned practical examples 5, 6 with an injection molding method of the conventional art.

The comparative example 3 is performed with the same materials and devices as the practical examples 5, 6, but in the comparative example, the melting synthetic resin 330 is fed into the mold 320 at a higher injection pressure than the practical examples 5, 6 to mold.

Concretely, the molding is molded by the following steps, first, the melting synthetic resin 330 is fed for 2.0 seconds at the injection pressure from the injection device 310 defined as 100 kg/cm², and the melting synthetic resin 330 is further fed for 4.8 seconds with the injection pressure increased to 200 kg/cm², and then, the melting synthetic resin 330 is cooled and solidified under the retained pressure defined as 400 kg/cm².

COMPARATIVE EXAMPLE 4

In order to ascertain the effects of the present invention, the comparative example 4 is conducted to obtain the same molding as the aforementioned practical examples 5, 6 with an injection molding method of the conventional art like the comparative example 3.

The comparative example 4 is performed with the same materials and devices as the practical examples 5, 6, but in the comparative example, the melting synthetic resin 330 is fed into the mold 320 at a lower injection pressure than the practical examples 5, 6 to mold.

Concretely, the molding is molded by the following steps, first, the melting synthetic resin 330 is fed at the injection pressure from the injection device 310 defined as 80 kg/cm², and the melting synthetic resin 330 is cooled and solidified under the retained pressure defined as 160 kg/cm².

RESULT OF EXPERIMENTS (1) The molding obtained in the practical example 5 results in that the melting synthetic resin 330 is infiltrated into the side of the cushion surface-member 331 out of an interface of the cushion surface-member 331 and the resin 330, and the thickness of the cushion surface-member 331 is slightly reduced from 5.0 mm to 4.2 mm, measuring at a distance of 50 mm from the direct-gate 329.

However, the cushioning properties of the cushion surface-member 331 remains sufficiently, and further the surface of the cushion surface-member 331 results in no disadvantages such as pits.

Furthermore, the infiltration of the melting synthetic resin 330 into the interface of the cushion surface-member 331 and the resin 330 produces an anchor effect, with the result that the cushion surface-member 331 and the resin 330 are mutually effected to have a firmly connected relationship.

Considering the reason stated thus far, according to the practical example 5, it is understood that the fine air current control valve can be obtained.

(2) The molding obtained in the practical example 6 results in that, like the practical example 5, the melting synthetic resin 330 is infiltrated into the interface of the cushion surface-member 331 and the resin 330. Also, the thickness of the cushion surface-member 331 is slightly reduced to 4.0 mm, measuring at the same point as the practical example 5.

Although the process of the injection mold finishes five seconds earlier than practical example 5, the cushioning properties of the cushion surface-member 331 remain sufficient as in the case of the practical example 5, and further there are no disadvantages such as pits on the surface of the cushion surface-member 331. Naturally, the anchor effect is produced, so that the cushion surface-member 331 and the resin 330 are mutually combined.

From the reason stated above, according to the practical example 6, it is understood that the fine air current control valve is obtained, moreover, the time taken to mold in the cycle process can be shorter.

(3) The molding obtained in the comparative example 3 results in that the thickness of the cushion surface-member 331 is remarkably reduced to 3.0 mm at the same point as the practical example 5. The reduction of the thickness causes inferior cushioning properties, so that it is understood that the fine air current control valve cannot be obtained in the case of the comparative example 3.

(4) In the comparative example 4, the melting synthetic resin 330 results in a short-shot state unable to feed the resin 330 into the whole cavity 323 of the mold 320 because of the insufficient injection pressure, with the result that the air current control valve having the predetermined configuration cannot be obtained. In short, it is understood that the air current control valve cannot be formed.

Although the present invention has been disclosed in detail by referring to particular preferred practical examples and a comparative example, it is to be understood that the present invention is not intended to be limited to the aforementioned practical examples and comparative example, and various changes and modifications on design may be made therein without departing from the spirit of the present invention.

For example, as synthetic resin consisting of the air current control valve, with not only polypropylene but also other types of synthetic resin such as polyethylene, polystyrene, ABS, polyamide may be used, and as filler added to the synthetic resin, with not only talc but also other types of filler such as calcium carbonate, mica and glass fiber may be used. However, if desired, filler may not be used.

As for the cushion surface-member, not only polyurethane but also other foamed member types such as polyethylene, polypropylene and polystyrene may be used.

As for the fastener means, the cushion surface-member 331 is adapted to be fixed in this case by the pins 328, but the cushion surface-member 331 may be fixed by a vacuum suction means which has, for example, suctorial ports opened on the mold-faces 326, 327 and a vacuum pump causing the suctorial ports to be in a vacuumized state in order to suck and fix the cushion surface-member 331 through the suctorial ports.

Furthermore, here, the melting synthetic resin 330 is adapted to be compressed with the compression core 320C provided in the movable mold portion 320B to be capable of moving toward and away from the stationary mold portion 320B, however, it is possible to omit the compression core and move the movable mold portion 320B toward and away from the stationary mold portion 320A to feed the melting synthetic resin.

As for the air current control valve, not only the cushion surface-members are attached to both of the mold-faces, but also the cushion surface-member may be attached to one mold-face.

Furthermore, the molding condition such as the set point of the compressive force and the starting time of each process is defined as not only the condition described in the aforementioned practical examples, but also the condition capable of selecting various values in response to the size of the molding, the type of resin or the like and of being suitably set at a concrete value desired in the execution.

SIXTH EMBODIMENT

Figure 20:
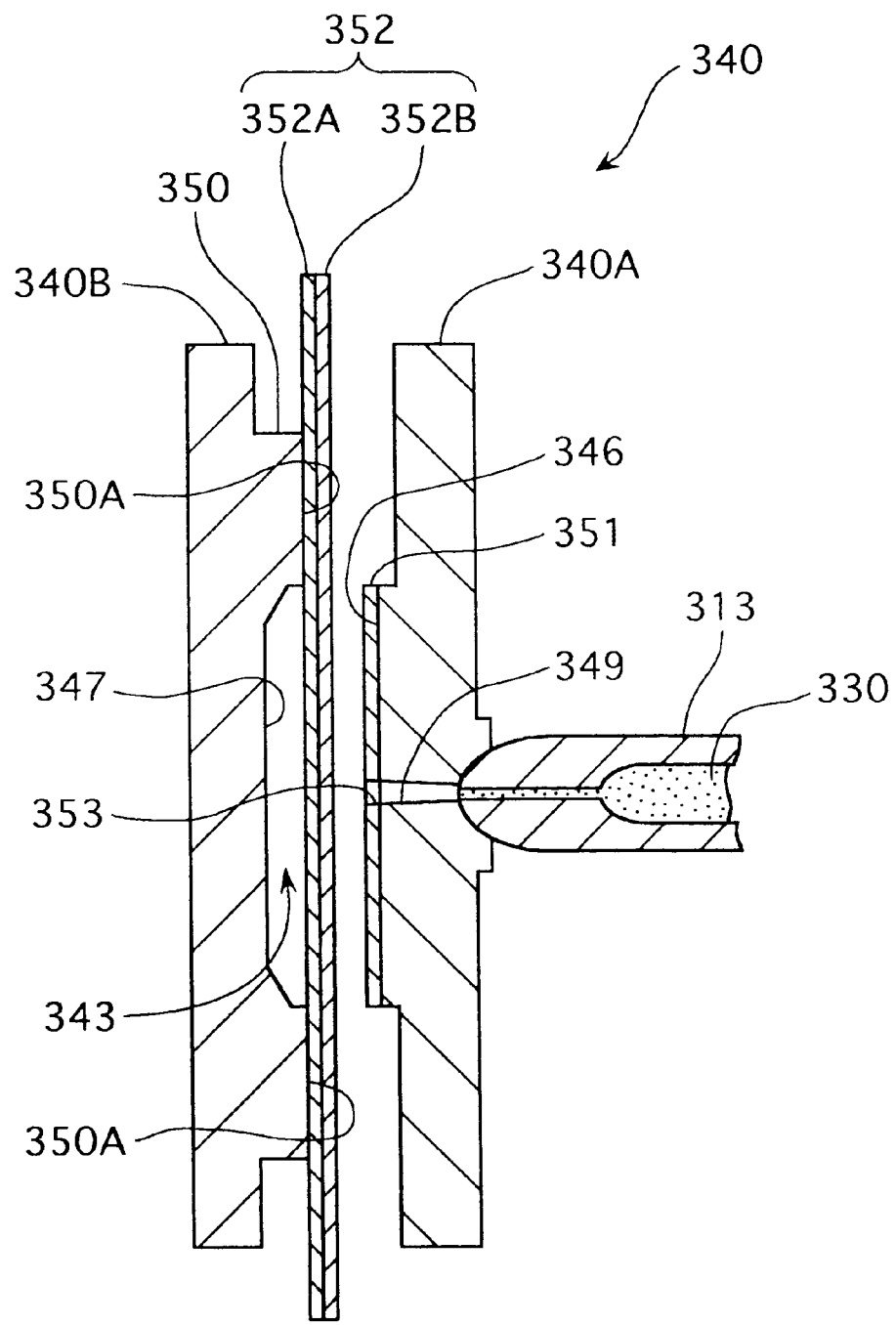
FIG. 20 is a fragmentary sectional view of a sixth embodiment according to the present invention.
Figure 20:
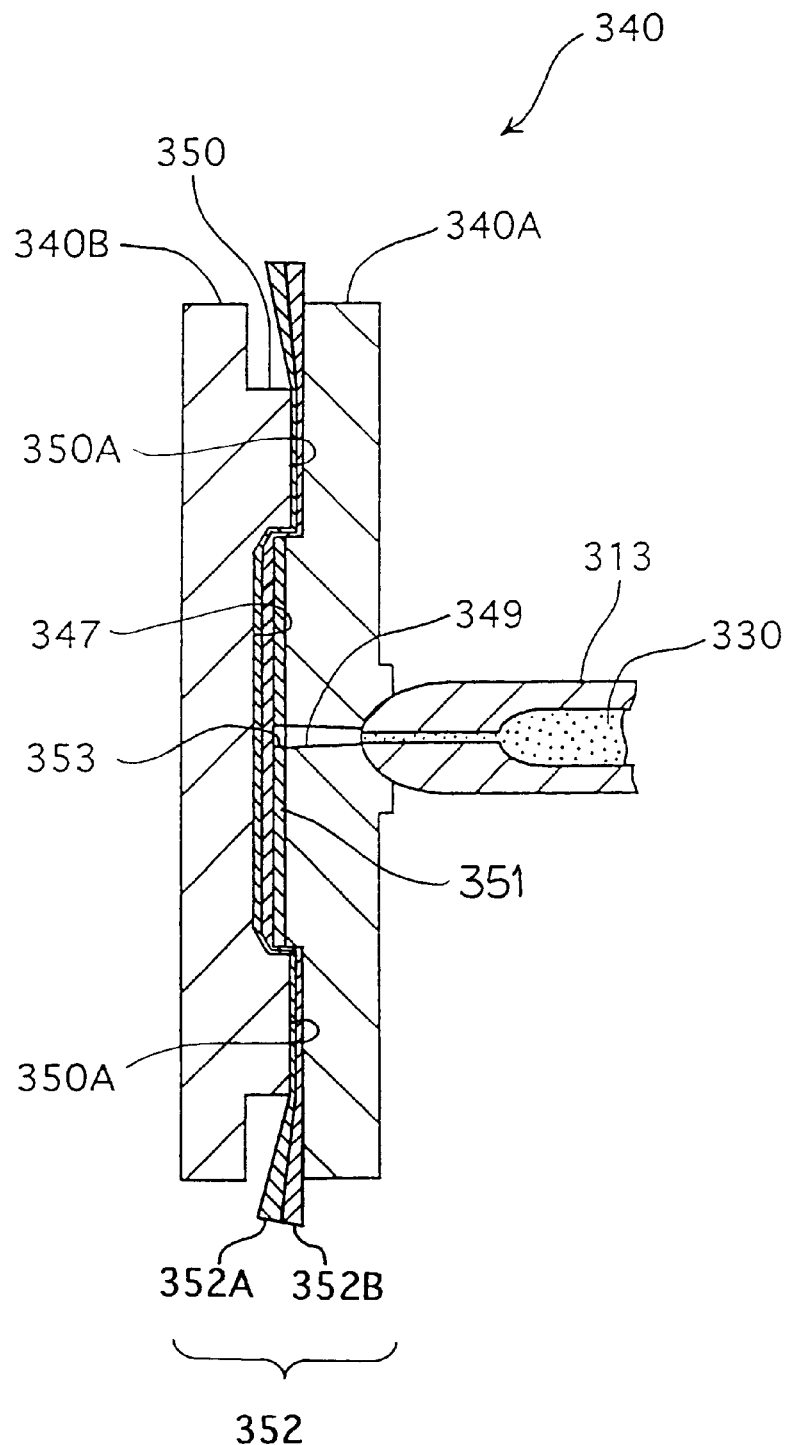

FIG. 20 shows a sixth embodiment according to the present invention. The embodiment uses a mold 340 in which the compression core is omitted from the mold 320 having the compression core 320C in the aforementioned fifth embodiment.

That is, the mold 340 is composed of a stationary mold portion 340A and a movable mold portion 340B, in which the stationary mold portion 340A is of a female half-member having a mold-face 346 projecting toward the movable mold portion 340B. Further, the movable mold portion 340B is of a male half-member having a mold-face 347 caving to receive the mold-face 346. These molds 340A and 340B are adapted to be the inrow system, namely, one mold portion moves to fit into the other mold portion.

The stationary mold portion 340A includes a direct-gate 349 at the central area of the mold-face 346 to guide the melting synthetic resin 330 into a cavity 343. The stationary mold portion 340A is adapted to be temporarily and closely attached to a cushion surface-member 351 to cover the whole mold-face 346.

On the other hand, the movable mold portion 340B includes a side wall 350 around the mold-face 347. The movable mold portion 340B is adapted to be temporarily and closely attached to an facing material 352 on the top side 350A of the side wall 350.

The cushion surface-member 351 is of a foaming sheet made of synthetic resin, and the facing material 352 is a face material laminated with a decorative thin synthetic resin sheet 352A and a foaming sheet made of synthetic resin 352B.

In the embodiment, after the cushion surface-member 351 and the facing material 352 are temporarily and closely attached to the mold 340, the mold 340 is then completely closed. In the closed, as seen in FIG. 20(A) state of the mold, the melting synthetic resin 330 starts feeding into the mold 340. When the melting synthetic resin 330 is fed to some extent and before the melting synthetic resin 330 is completely fed, the mold 340 is slightly opened to secure a predetermined compression margin A while the melting synthetic resin is being fed.

At this time, the mold 340 is completely closed, and the cushion surface-member 351 is compressed by clamping the mold to sufficiently push the cushion surface-member 351. In the above state, the melting synthetic resin 330 is fed continuously.

Therefore, the cushion surface-member 351 is not deformed even if the melting synthetic resin 330 presses the cushion surface-member 351 forcibly. And, an involved phenomenon for the melting synthetic resin 330 is not produced around a through-hole 353 opened on the cushion surface-member 351.

From this time onwards, production of the laminated molding is carried out under similar steps to the aforementioned fifth embodiment.

In the embodiment set forth thus far, the action and the effects similar to the fifth embodiment are obtained, besides the involved phenomenon for the melting synthetic resin 330 is prevented, whereby the effect of an improvement in the visual quality of the laminated molding is added.

PRACTICAL EXAMPLE 7

Next, the effects of the present invention will be explained in accordance with a concrete practical example.

The practical example 7 is of an experiment with molding the air current control valve used in an air conditioner for a vehicle.

Figure 21:
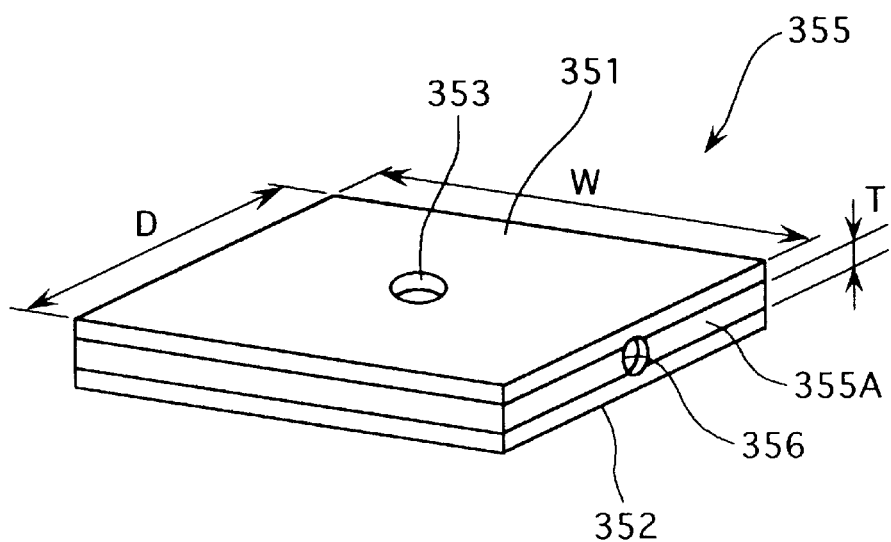
FIG. 21 is a perspective view of a molding molded in practical example 7 according to the present invention.

FIG. 21 shows the air current control valve 355 which will be molded in the practical example 7. The air current control valve 355 is of a laminated molding shaped into a quadrangle, in which, as can be seen from the drawing, the cushion surface-member 351 is united with the upper-face side of a base plate 355A made of synthetic resin, while the facing material 352 is united with the lower-face side of the base plate 355A. As can be seen from the drawing, there is provided a bearing hole 356 on each side (right/left) of the air current control vender 355. The bearing hole 356 is opened at the central area of the lateral side of the air current control valve 355.

Each measurement of the air current control valve 355 is defined as a width W of 140 mm and a depth D of 200 mm, while the measurement of the base plate 355A is defined as a thickness T of 12 mm, and the bearing hole 356 is defined as a diameter of 16 mm.

Thickness of the cushion surface-member 351 is defined as 7 mm and the foaming sheet 352B of the facing material 352 is also defined as 7 mm.

Figure 22:
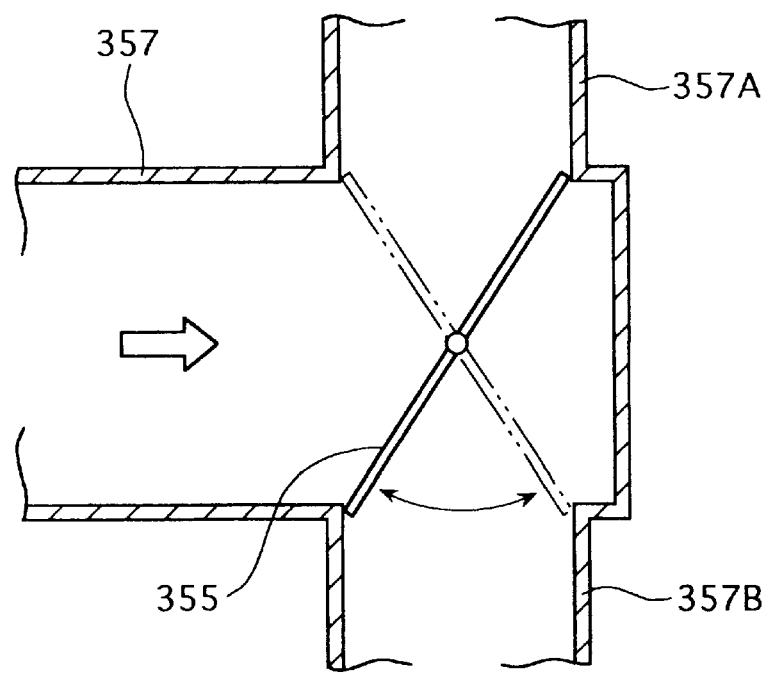
FIG. 22 is a sectional view of a used instance of the molding molded in practical example 7.

The air current control valve 355 molded as described thus far, as shown in FIG. 22, is rotatably provided in a duct 357 having two branch lines, branch-ducts 357A, 357B to facilitate to change round the two branch-ducts 357A, 357B and so on.

INJECTION CONDITION

The practical example 7 is performed with the following materials, apparatus, molding condition and so on to mold the molding.

(1) MATERIALS

Polypropylene (MI 20 g/10 min., 230° C., 2.16 kgf) added in mica is used as synthetic resin consisting of the molding. Mixing ratio is mica 30 Wt % to polypropylene 70 Wt %.

Materials of both the cushion surface-member 351 and the foaming sheet 352B are of a foaming polyurethane.

(2) MOLDING APPARATUS

The same apparatus used in the practical example 6 is used in the practical example 7.

(3) STEPS FOR MOLDING

① The cushion surface-member 351 and the facing material 352 are temporarily fixed in the mold 340.

② After the mold 340 is completely closed, the cushion surface-member 351 and the facing material 352 are compressed to be condensed.

③ Starting the injection of the melting synthetic resin 330 into the mold 340, the melting synthetic resin 330 is fed between the condensed cushion surface-member 351 and facing material 352.

④ After 0.3 seconds from starting the injection, while the melting synthetic resin 330 is being fed, the movable mold portion 340B is moved back by 30 mm to secure the compression margin A, and after 30 seconds have passed from starting the injection, the feed of the melting synthetic resin 330 finishes.

⑤ Just before or after the melting synthetic resin 330 is fed, the movable mold portion 340A is moved towards the stationary mold portion 340B. Thus, a compression molding in which the melting synthetic resin 330 is molded while undergoing the compressive force is taking place.

⑥ After the melting synthetic resin 330 is cooled and finishes molding, and before the melting synthetic resin 330 completely hardens, the compressive force applied to the melting synthetic resin 330 is decreased.

⑦ When the melting synthetic resin 330 is completely cooled and hardened, the mold 340 is opened to take out the air current control valve from the inside of the mold.

RESULT OF EXPERIMENTS

The air current control valve obtained in the practical example results in that the united cushion surface-member 351 and foaming sheet 352B are slightly crushed. The thickness is reduced from a measurement of 7.0 mm before molding to 6.0 mm afterwards. This minor change means the cushioning properties have been retained.

And, an involved phenomenon for the melting synthetic resin 330 is not produced around a through-hole 353 opened on the cushion surface-member 351, whereas the visual quality of the air current control valve 355 is effected positively.

According to the practical example 7 set forth thus far, it is understood that the air current control valve having fine cushioning properties and visual quality is obtained.

What is claim is:

1. A method of producing a laminated molding having facing material on at least one side, comprising the steps of:

providing a mold with a stationary mold portion and a movable mold portion that is capable of movement towards and away from said stationary mold portion, said stationary mold portion being provided with a mold face and said movable mold portion being provided with a mold face located opposite said mold face of said stationary mold portion;

placing said mold in an open position wherein said movable mold portion is placed in a distal position relative to said stationary mold portion;

temporarily securing a sheet of compressible facing material to at least one of said opposed mold faces;

placing said mold in a closed position wherein said movable mold portion is positioned proximal to said stationary mold portion so that the compressible facing material is compressed between said stationary mold portion and said movable mold portion;

performing a molten resin feed step by feeding a molten resin between the compressible facing material and said mold face opposite said mold face to which the compressible facing material is secured so that the molten resin flows between the compressible facing material and said mold face;

after initiating said molten resin feed step, retracting said movable mold portion away from said stationary mold portion simultaneously with the continuation of said molten resin feed step to define a space into which the molten resin flows during said molten resin feed step;

terminating said retracting of said movable mold portion and resetting said movable mold portion so that said mold applies a first compressive force against said molten resin;

terminating said molten resin feed step;

before said molten resin fully hardens, resetting said movable mold portion so that said mold applies a second compressive force against said molten resin, said second compressive force being less than said first compressive force;

allowing said molten resin to cool and completely harden to form the laminated molding while maintaining said second compressive force against said molten resin; and after the laminated molding is formed, opening said mold by retracting the movable mold portion away from the laminate molding and removing the laminated molding from said mold.

2. The method of producing a laminated molding according to claim 1, wherein said stationary mold portion is formed with a gate that opens into said mold face integral with said stationary mold portion and said molten resin is fed into said mold through the gate.

3. The method of producing a laminated molding according to claim 1, wherein the compressible facing material is attached to said mold face integral with said stationary mold portion.

4. The method of producing a laminated molding according to claim 3, wherein said stationary mold portion is formed with a gate that opens into said mold face integral with said stationary mold portion; the compressible facing material is formed with an opening and, in said compressible facing material securing step, the compressible facing material is attached to said mold face integral with said stationary mold portion so that the opening is aligned with said gate; and said molten resin is fed into said mold through the gate and the opening in the compressible facing material.

5. The method of producing a laminated molding according to claim 1, wherein the laminated molding produced is an air control valve.

6. The method of producing a laminated molding according to claim 1, wherein the compressible facing material is selected from the group consisting of: non-woven fabric; woven fabric; resin material; a foam made from a resin and a multilayered material consisting of a foam made from a resin and an outer layer.

7. The method of producing a laminated molding according to claim 1, wherein, prior to said step of terminating said molten resin feed step, said movable mold portion is moved towards said stationary mold portion to initiate said step of applying said first compressive force against said molten resin.

8. The method of producing a laminated molding according to claim 1, wherein, after said step of terminating said molten resin feed step, said movable mold portion is moved towards said stationary mold portion to initiate said step of applying said first compressive force against said molten resin.

9. A method of producing a laminated molding having facing material on opposed sides, comprising the steps of:

providing a mold with a stationary mold portion and a movable mold portion that is capable of movement towards and away from said stationary mold portion, said stationary mold portion being provided with a mold face and said movable mold portion being provided with a mold face located opposite said mold face of said stationary mold portion;

placing said mold in an open position wherein said movable mold portion is placed in a distal position relative to said stationary mold portion;

temporarily securing a sheet of compressible facing material on each said mold face;

placing said mold in a closed position wherein said movable mold portion is positioned proximal to said stationary mold portion so that the sheet of compressible facing material secured to said mold face of said movable mold portion is in contact with the sheet of compressible facing material secured to said mold face of said stationary mold portion and the sheets of compressible facing material are compressed by said mold portions;

performing a molten resin feed step by feeding a molten resin between the sheets of compressible facing material so that the molten resin flows between the sheets of compressible facing material;

after initiating said molten resin feed step, retracting said movable mold portion away from said stationary mold portion simultaneously with the continuation of said molten resin feed step to define a space between the sheets of compressible facing material into which the molten resin flows during said molten resin feed step;

terminating said step of retracting said movable mold portion and resetting said movable mold portion so that said mold applies a first compressive force to said molten resin;

terminating said molten resin feed step;

before said molten resin fully hardens, resetting said movable mold portion so that said mold applies a second compressive force against said molten resin, said second compressive force being less than said first compressive force;

allowing said molten resin to cool and harden to form the laminated molding while maintaining said second compressive force against said molten resin; and after the laminated molding is formed, opening said mold by retracting the movable mold portion away from the laminate molding and removing the laminated molding from said mold.

10. The method of producing a laminated molding according to claim 9, wherein said stationary mold portion is formed with a gate that opens into said mold face integral with said stationary mold portion; the sheet of compressible facing material secured to said stationary mold portion is formed with an opening; and, during said step of securing the sheets of compressible material, the sheet of compressible material secured to said mold face integral with said stationary mold is secured to said mold face integral with said stationary mold so that the opening in the sheet of compressible material is aligned with said gate; and said molten resin is fed into said mold through the gate and the opening in the sheet of facing material.

11. The method of producing a laminated molding according to claim 9, wherein the laminated molding produced is an air control valve.

12. The method of producing a laminated molding according to claim 9, wherein the sheets of compressible facing material are selected from the group consisting of: non-woven fabric; woven fabric; resin material; a foam made from resin; and a multilayered material consisting of a foam made from resin and an outer layer.

13. The method of producing a laminated molding according to claim 9, wherein, prior to said step of terminating said molten resin feed step, said movable mold portion is moved towards said stationary mold portion to initiate said step of applying said first compressive force against said molten resin.

14. The method of producing a laminated molding according to claim 9, wherein, after said step of terminating said molten resin feed step, said movable mold portion is moved towards said stationary mold portion to initiate said step of applying said first compressive force against said molten resin.

15. The method of producing a laminated molding according to claim 3, wherein, after said second compressive force is applied against said molten resin and prior to said molten resin completely hardening, resetting said moveable mold portion so that said mold applies a third compressive force against said molten resin, said third compressive force being less than said first compressive force and greater than said second compressive force.

16. The method of producing a laminated molding according to claim 9, wherein, after said second compressive force is applied against said molten resin and prior to said molten resin completely hardening, resetting said moveable mold portion so that said mold applies a third compressive force against said molten resin, said third compressive force being less than said first compressive force and greater than said second compressive force.

* * * * *